US011772807B2

(12) United States Patent
Kuang et al.

(10) Patent No.: US 11,772,807 B2
(45) Date of Patent: Oct. 3, 2023

(54) ELECTRIC DISTRIBUTED ANTI-TORQUE ARCHITECTURE

(71) Applicant: Textron Innovations Inc., Providence, RI (US)

(72) Inventors: Chen Kuang, Montreal (CA); Marc Bustamante, Montreal (CA); Thuvaragan Senthilnathan, Laval (CA); Marc Ouellet, Sainte-Sophie (CA); Guillaume Biron, Blainville (CA)

(73) Assignee: Textron Innovations Inc., Providence, RI (US)

( * ) Notice: Subject to any disclaimer, the term of this patent is extended or adjusted under 35 U.S.C. 154(b) by 556 days.

(21) Appl. No.: 16/905,657

(22) Filed: Jun. 18, 2020

(65) Prior Publication Data

US 2021/0394896 A1    Dec. 23, 2021

(51) Int. Cl.
*B64D 31/00* (2006.01)
*B64D 31/04* (2006.01)
(Continued)

(52) U.S. Cl.
CPC .............. *B64D 31/04* (2013.01); *B64C 27/82* (2013.01); *B64D 27/24* (2013.01); *G05B 9/03* (2013.01);
(Continued)

(58) Field of Classification Search
CPC .... B64D 31/04; B64D 27/24; B64D 2221/00; B64C 27/82; B64C 2027/8209;
(Continued)

(56) References Cited

U.S. PATENT DOCUMENTS 4,953,098 A * 8/1990 Fischer, Jr. ........... B64C 27/325
702/56
5,694,014 A   12/1997 Hegg et al.
(Continued)

FOREIGN PATENT DOCUMENTS

EP    3243750 A1    11/2017
EP    3339600 B1    8/2019
(Continued)

OTHER PUBLICATIONS

Bustamante, Marc, et al.; "Distributed Propulsion With Thermal Management"; U.S. Appl. No. 16/891,971, filed Jun. 3, 2020; 40 pages.

*Primary Examiner* — Peter D Nolan
*Assistant Examiner* — Peter Y Ning
(74) *Attorney, Agent, or Firm* — Bradley Arant Boult Cummings LLP

(57) ABSTRACT

An architecture for an electric distributed propulsion system includes one or more generators connected to a gearbox, a first and a second plurality of motors connected to the one or more generators, each motor of the plurality of motors connected to a blade to provide thrust, a first and a second power bus electrically connected between the one or more generators and the first and the second plurality of motors, each power bus independent of the other power bus, a first and a second controller independently connected to each of the first and second plurality of motors, each of the first and second controllers serving as a primary and a backup controller, and dual channels in communication between pilot input sensors and the first and the second controllers, and the dual channels including an additional channel to provide redundant communication to the first and second controllers.

10 Claims, 19 Drawing Sheets

(51) Int. Cl.
  *B64C 27/82* (2006.01)
  *B64D 27/24* (2006.01)
  *H02P 5/50* (2016.01)
  *H02P 9/06* (2006.01)
  *H02P 9/08* (2006.01)
  *H02P 5/46* (2006.01)
  *G05B 9/03* (2006.01)
  *H02P 101/30* (2015.01)

(52) U.S. Cl.
  CPC .......... *H02P 5/46* (2013.01); *H02P 5/50* (2013.01); *H02P 9/06* (2013.01); *H02P 9/08* (2013.01); *B64C 2027/8209* (2013.01); *B64C 2027/8227* (2013.01); *B64D 2221/00* (2013.01); *H02P 2101/30* (2015.01)

(58) Field of Classification Search
  CPC ..... B64C 2027/8227; G05B 9/03; H02P 5/46; H02P 5/50; H02P 9/06; H02P 9/08; H02P 2101/30
  See application file for complete search history.

(56) References Cited

U.S. PATENT DOCUMENTS

| | | | | |
|---|---|---|---|---|
| 5,806,805 | A * | 9/1998 | Elbert | B64C 13/42 244/76 A |
| 10,526,085 | B2 * | 1/2020 | Fenny | H02P 29/032 |
| 11,139,716 | B2 * | 10/2021 | Husband | H02P 9/02 |
| 2013/0311006 | A1 | 11/2013 | Ahmad et al. | |
| 2015/0185111 | A1 * | 7/2015 | Armstrong | F02C 9/00 702/34 |
| 2016/0107748 | A1 | 4/2016 | Luyks | |
| 2016/0200436 | A1 * | 7/2016 | North | B64D 27/24 244/7 R |
| 2016/0236790 | A1 * | 8/2016 | Knapp | B64D 27/24 |
| 2016/0340035 | A1 * | 11/2016 | Duru | B64D 27/04 |
| 2017/0081019 | A1 | 3/2017 | Lin et al. | |
| 2017/0147006 | A1 * | 5/2017 | Yang | B64C 39/02 |
| 2017/0158342 | A1 | 6/2017 | Ishii et al. | |
| 2017/0203839 | A1 * | 7/2017 | Giannini | B64D 27/24 |
| 2017/0222594 | A1 | 8/2017 | Tao | |
| 2017/0305541 | A1 * | 10/2017 | Vallart | F01D 13/003 |
| 2017/0349273 | A1 | 12/2017 | Parsons et al. | |
| 2017/0349274 | A1 | 12/2017 | Fenny et al. | |
| 2017/0349276 | A1 | 12/2017 | Fenny | |
| 2018/0002026 | A1 | 1/2018 | Oldroyd et al. | |
| 2018/0072430 | A1 | 3/2018 | Misfeldt | |
| 2018/0099739 | A1 * | 4/2018 | Salesse-Lavergne | B64C 13/42 |
| 2018/0215462 | A1 | 8/2018 | Fenny et al. | |
| 2018/0229606 | A1 * | 8/2018 | Vondrell | B64C 39/024 |
| 2018/0244376 | A1 | 8/2018 | Fenny et al. | |
| 2018/0346135 | A1 | 12/2018 | Haldeman et al. | |
| 2019/0225349 | A1 | 7/2019 | Sinusas et al. | |
| 2019/0283865 | A1 | 9/2019 | Mueller et al. | |
| 2020/0017206 | A1 | 1/2020 | Waltner et al. | |
| 2020/0023958 | A1 | 1/2020 | Acee et al. | |
| 2020/0062414 | A1 | 2/2020 | Hon et al. | |
| 2020/0070966 | A1 | 3/2020 | Alfred | |
| 2020/0081786 | A1 * | 3/2020 | Galvão | G05B 9/03 |
| 2020/0148347 | A1 * | 5/2020 | Bevirt | B64D 27/24 |
| 2020/0172235 | A1 * | 6/2020 | Nissen | B64D 35/06 |
| 2020/0195065 | A1 * | 6/2020 | Hennig | H02K 1/20 |
| 2020/0283134 | A1 * | 9/2020 | Mores | B64C 27/10 |
| 2020/0290742 | A1 * | 9/2020 | Kumar | B64D 27/24 |
| 2020/0307811 | A1 | 10/2020 | Shang et al. | |
| 2020/0309045 | A1 * | 10/2020 | Gomez | F02D 35/0007 |
| 2020/0385112 | A1 * | 12/2020 | Brunetti | B64D 27/24 |
| 2020/0407060 | A1 * | 12/2020 | Hosseini | B64C 15/00 |
| 2021/0309351 | A1 * | 10/2021 | Giannini | B64D 27/24 |
| 2021/0316874 | A1 * | 10/2021 | Resnick | B60L 3/0023 |
| 2022/0041299 | A1 * | 2/2022 | Wankewycz | B64C 27/24 |
| 2022/0177147 | A1 * | 6/2022 | Klonowski | B64D 27/24 |
| 2022/0212547 | A1 * | 7/2022 | Poumarede | B60L 50/10 |

FOREIGN PATENT DOCUMENTS

| | | |
|---|---|---|
| GB | 1597318 A | 9/1981 |
| WO | WO-2019123419 A1 | 6/2019 |
| WO | WO-2020242899 A1 | 12/2020 |

\* cited by examiner

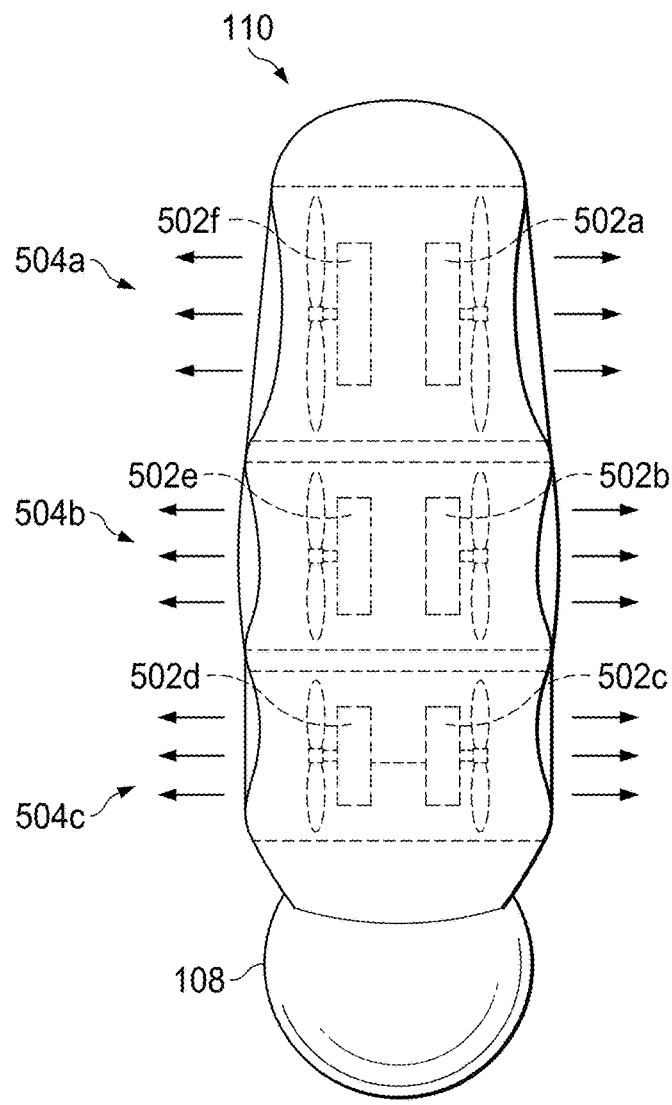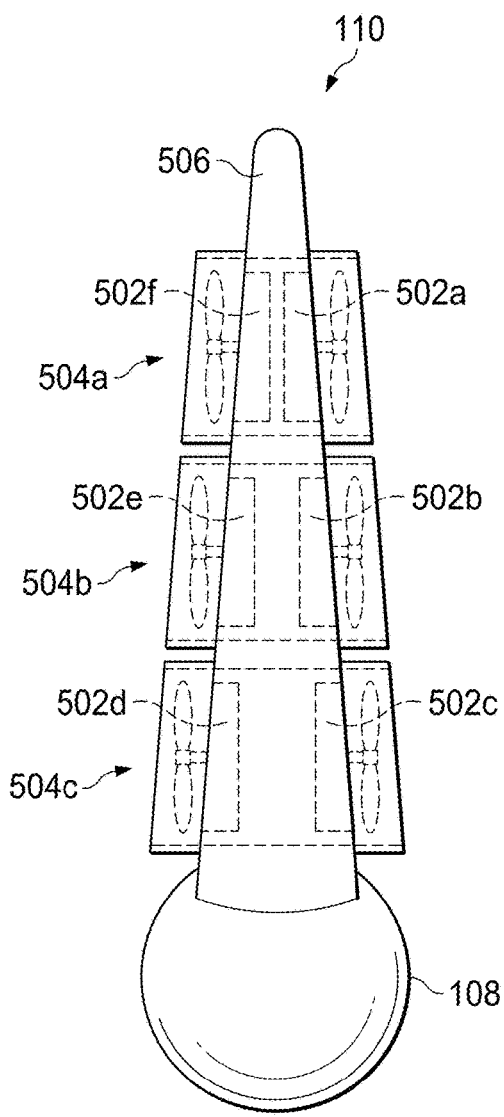
FIG. 5A
FIG. 5B

ELECTRIC DISTRIBUTED ANTI-TORQUE ARCHITECTURE

TECHNICAL FIELD

This disclosure relates in general to the field of aircraft, and more particularly, but not by way of limitation, to the field of flight control and redundant power and control for electric distributed propulsion.

BACKGROUND

This section provides background information to facilitate a better understanding of the various aspects of the disclosure. It should be understood that the statements in this section of this document are to be read in this light, and not as admissions of prior art.

Counter-torque tail rotors are often used in helicopters and are generally mounted adjacent to vertical fins that provide for aircraft stability. In such a configuration, the helicopter rotor produces a transverse airflow. Tail rotors can be driven at high angular velocities to provide adequate aerodynamic responses. Sometimes, vortices produced by a main helicopter rotor and the tail rotor can interact to reduce the efficiency of the thrust created by the rotors. The interference of the vortices may also cause an increase in noise. To address these issues, the vertical fin can be replaced by an annular airfoil (sometimes called a ring wing) having an inner diameter greater than the diameter of the tail rotor and which can be mounted around the tail rotor.

SUMMARY

An exemplary electric distributed propulsion system for an aircraft includes one or more generators connected to a gearbox, a first and a second plurality of motors connected to the one or more generators, wherein each motor of the first and second plurality of motors is connected to a blade to provide thrust, a first and a second power bus electrically connected between the one or more generators and the first and the second plurality of motors, wherein each power bus is independent of the other power bus, a first and a second controller independently connected to each of the first and second plurality of motors, wherein each of the first and second controllers serves as a primary and a backup controller to provide redundant control to both the first and the second plurality of motors, and dual channels in communication between pilot input sensors and the first and the second controllers, wherein each channel of the dual channels is independent of the other channels, and the dual channels comprise an additional channel to provide redundant communication to the first and second controllers.

An exemplary method of operating an aircraft with an electric distributed propulsion system driving a gearbox with an engine, generating generator electrical power in response to the gearbox mechanically driving one or more generators, communicating the generator electrical power to a first and second plurality of motor individually driving rotors, producing thrust from at least one of the first and the second plurality of motors, communicating electrical power from one or more motors of the first and second plurality of motors to the electric storage device.

An exemplary method of operating a helicopter having a main rotor and a first and second plurality of motors with blades located on a tail boom, includes driving the gearbox with an engine, the gearbox rotating a main rotor, generating generator electrical power in response to the gearbox mechanically driving one or more generators, wherein a first generator of the one or more generators is a starter- or motor-generator, communicating the generator electrical power to the first and the second plurality of motors located on a tail boom, producing thrust from at least one of the first and the second plurality of motors, powering, responsive for example to engine failure, the first generator with stored electricity from the electric storage device, driving the gearbox with the first generator thereby driving the one or more generators and supplying generator electrical power to the first and second plurality of motors, and producing thrust with at least one of the first and second plurality of motors.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIGS. 5A and 5B illustrate variants of co-axially positioned motors with outwardly facing blades (fan) in an exemplary electric distributed propulsion system.

DETAILED DESCRIPTION

Figure 1:
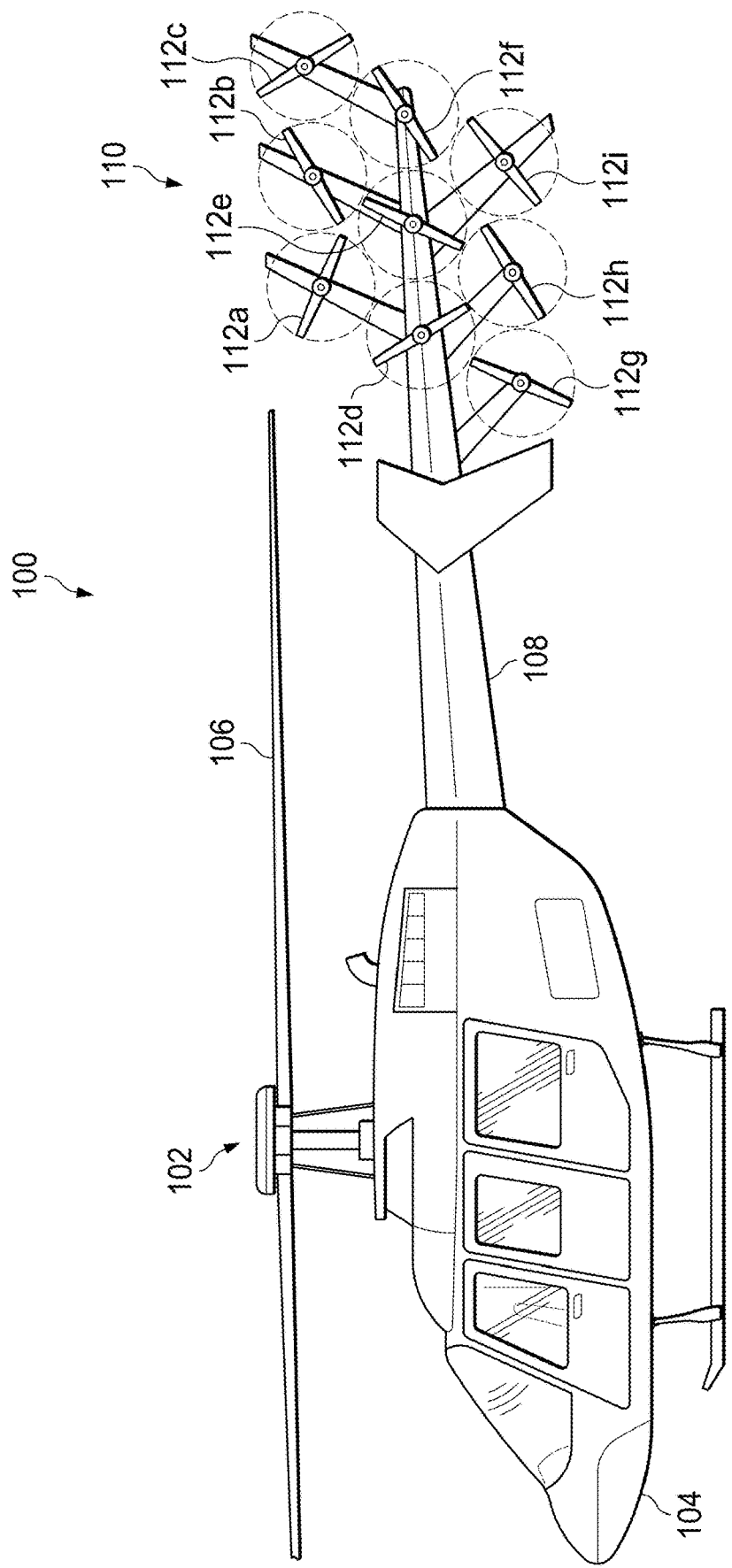
FIG. 1 is a side-view schematic diagram of an exemplary aircraft showing an exemplary electric distributed propulsion system arranged as an anti-torque matrix.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Most helicopters with a single, main rotor system require a separate rotor to overcome torque. This is traditionally accomplished on helicopters using a variable pitch, anti-torque rotor or tail rotor receiving power from the engine(s) through shafts and gearboxes. While many attempts have been made to power a traditional single tail rotor directly using a large electric motor to replace traditional shafts and gearboxes. These attempts proved to be impractical due for example to the excessive weight of an electric motor capable of providing the required torque and speed to power a traditional tail rotor. Additionally the safety reliability of a single or even a dual electric motor does not approach the safety reliability of shafts and gearboxes.

Systems disclosed herein are directed to a redundant system to provide electrical power and computer control to an array of electric motors used to generate thrust, such as anti-torque thrust and yaw flight control on aircraft such as helicopters. The systems may use redundant generators and flight control computers in a unique architecture to provide necessary flight safety in the event of a component or system failure.

Since electric motor power density becomes less practical with increasing motor size, "distributed propulsion" makes use a larger quantity of smaller motors. Combining the shaft output of multiple small motors into a single shaft output using a gearbox wipes out any weight savings and introduces thermal issues, which can require the addition of fluid cooling systems and even more weight. However, by distributing multiple small motors over the airframe, the total aircraft structural weight can be reduced by spreading smaller propulsion induced loads across the entire aircraft. Separating the motors by at least a rotor diameter also provides effective convection cooling. With existing electric power storage technology (batteries, fuel cells) the application of distributed propulsion on manned fixed wing aircraft is becoming more practical, but range is very limited. In the event of depletion of stored energy, a fixed wing aircraft can still possibly glide to a safe landing. This is not the same case with application of distributed propulsion for lift propulsion on helicopters. On helicopters with distributed propulsion, the rotational inertia of the multiple small rotors is inadequate to support autorotation for safe landing. This combined with the higher power demands required for vertical lift rotors makes pure electric helicopters impractical until a dramatic increase in electric power storage technology occurs.

On manned helicopter configurations incorporating distributed propulsion, a dedicated system for anti-torque control is not required. Multiple small rotors cancel out each other's torque and changing rotor speeds can generate control yaw. Therefore, the application of distributed propulsion specifically for anti-torque control appears to have been overlooked.

For example, using a Bell model 407 tail rotor for sizing analysis, using existing commercially available electric Sport Light application electric motors and propellers, it is possible to generate equivalent thrust with a matrix of 3 by 3 or 4 by 4 fixed or variable blade pitch electric motor modules in approximately the same disc area. With an approximate fixed or variable blade pitch electric motor module conservative weight of 5 pounds (2.2 kilos) (for 3 by 3 matrix), the total weight minus structure and system installation is 45 pounds (20 kilos). This weight is comparable to the current 407 rotor and gearbox weight. The one starter/generator on the 407 does not provide adequate power or reliability to support operation of the matrix of fixed or variable blade pitch motor modules. However, the elimination of the tail rotor output shaft provides for a main gearbox accessory drive pad to mount redundant generators. Because the added generator capacity is over sized for safety reliability, with both generators operating approximately 40 kW power can be made available for non-flight critical uses. Similar calculations apply to the use of hydraulic motors.

Another advantage of the use of a matrix of fixed or variable blade pitch motor modules is that, in the event of loss of all aircraft engine power, the power demand for anti-torque control thrust becomes minimal. Therefore, the impact on the aircraft's electric power systems and rotor energy is also minimal in the event of an autorotation landing. With increasing forward flight speed the interaction of airflow between rotors results in the aft-most rotors losing their effectiveness. Commensurately, with increasing forward speed the anti-torque thrust required decreases. Therefore, with increasing forward speed the aft most modules will be progressively shut off to eliminate unneeded power consumption and reduce noise.

Non-limiting examples of electric motors a self-commutated motor, an externally commutated motor, a brushed motor, a brushless motor, a linear motor, an AC/DC synchronized motor, an electronic commutated motor, a mechanical commutator motor (AC or DC), an asynchronous motor (AC or DC), a pancake motor, a three-phase motor, an induction motor, an electrically excited DC motor, a permanent magnet DC motor, a switched reluctance motor, an interior permanent magnet synchronous motor, a permanent magnet synchronous motor, a surface permanent magnet synchronous motor, a squirrel-cage induction motor, a switched reluctance motor, a synchronous reluctance motor, a variable-frequency drive motor, a wound-rotor induction motor, an ironless or coreless rotor motor, or a wound-rotor synchronous motor.

FIG. 1 is a side-view schematic diagram of an exemplary helicopter 100 having an exemplary anti-torque matrix 110, depicted in this version with nine fixed or variable blade pitch motors 112a-112i, which can be electrically or hydraulically-driven motors. Helicopter 100 includes a rotary system 102 carried by a fuselage 104. Rotor blades 106 connected to rotary system 102 provide flight for helicopter 100. Rotor blades 106 are controlled by multiple controllers within fuselage 104. For example, during flight, a pilot can manipulate cyclic controllers for changing a pitch angle of rotor blades 106 and/or manipulate pedals to provide vertical, horizontal and yaw flight control. Helicopter 100 has a tail boom 108, which supports anti-torque matrix 110 at the aft end. Each of fixed or variable blade pitch motors 112a-112i can be operated individually or in groups to provide counter-torque force for transversely stabilizing helicopter 100. Each of fixed or variable blade pitch motors 112a-112i is mounted as part of anti-torque matrix 110 on tail boom 108. Anti-torque matrix 110 is centered on a hub such that a leading edge of anti-torque matrix 110 is presented to the side of helicopter 100 toward tail boom 108. For example, when a single main rotor helicopter 100 is rotating counter-clockwise when viewed from above, the leading edge of anti-torque matrix 110 is to the right (starboard) side of helicopter 100.

Figure 2:
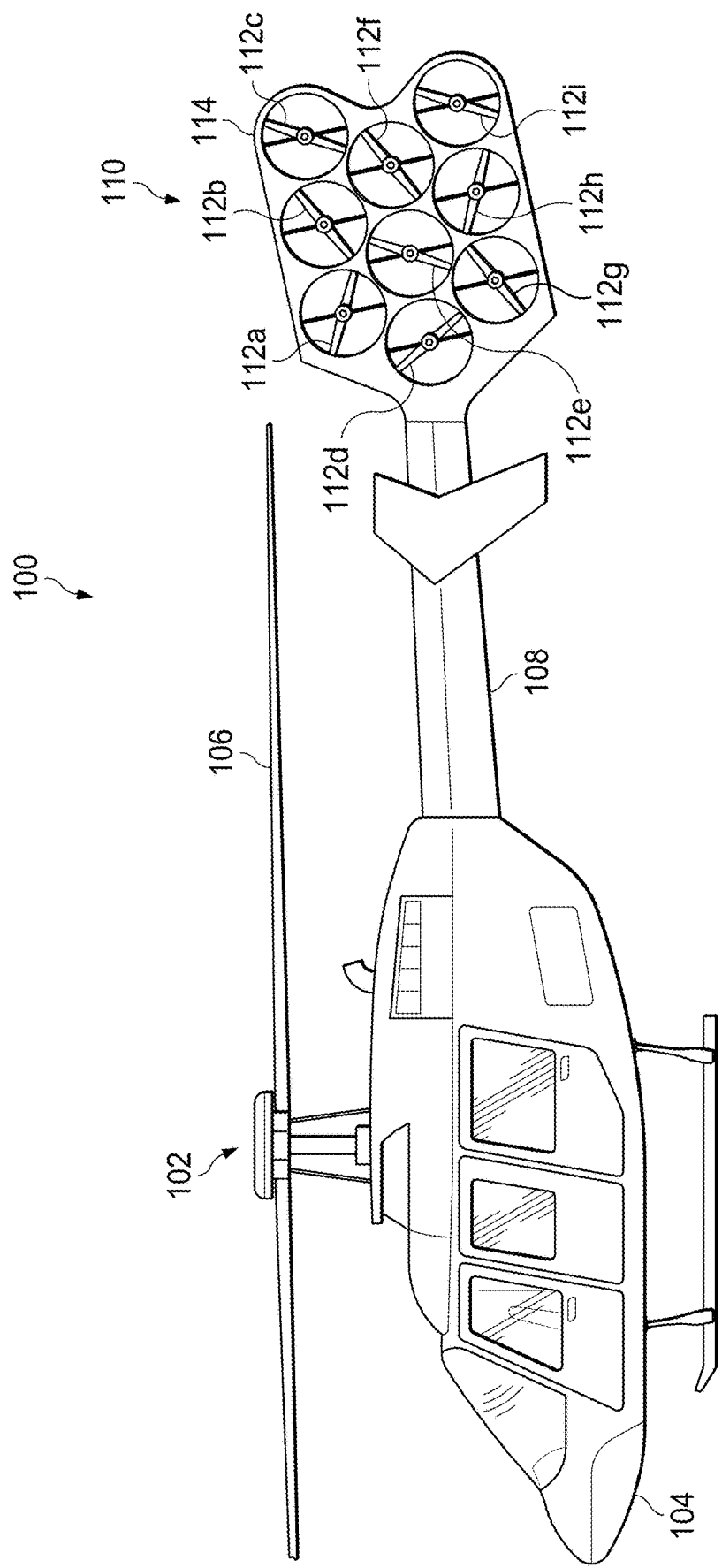
FIG. 2 shows the use of multiple ducted rotors to generate anti-torque thrust.

FIG. 2 shows the use of multiple ducted rotors to generate anti-torque thrust. In this example a helicopter 100 has anti-torque matrix 110, depicted in this version with nine fixed or variable blade pitch motors 112a-112i, which can be electrically or hydraulically-driven motors, each of which are individually ducted. Anti-torque matrix 110 can further include a surface 114 that forms part of the ducting for the nine-fixed or variable blade pitch motors 112a-112i. As is the case with the helicopter in FIG. 1, helicopter 100 includes a rotary system 102 carried by a fuselage 104. Rotor blades 106 connected to rotary system 102 provide flight for helicopter 100. Rotor blades 106 are controlled by multiple controllers within fuselage 104. For example, during flight, a pilot can manipulate cyclic controllers for changing a pitch angle of the rotor blades 106 and/or manipulate pedals to provide vertical, horizontal and yaw flight control. Helicopter 100 has a tail boom 108, which supports anti-torque matrix 110 at the aft end, which also permits rotation of anti-torque matrix 110 about the longitudinal axis of tail boom 108. Each of fixed or variable blade pitch motors 112a-112i can be operated individually or in groups to provide counter-torque force for transversely stabilizing helicopter 100. Each of the fixed or variable blade pitch motors 112a-112i is mounted as part of anti-torque matrix 110 on tail boom 108. Anti-torque matrix 110 is centered on a hub such that a leading edge of anti-torque matrix 110 is presented to the side of helicopter 100 toward tail boom 108. For example, when a single main rotor helicopter 100 is rotating counter-clockwise when viewed from above, the leading edge of anti-torque matrix 110 is to the right (starboard) side of helicopter 100.

In operation, anti-torque matrix 110 is oriented substantially in-plane with tail boom 108 of helicopter 100 during a first mode of helicopter operation. The skilled artisan will recognize that anti-torque matrix 110 may be a first anti-torque matrix 110, with a second anti-torque matrix 110 that is substantially parallel to the first providing additional motors and fixed or variable pitch blades that, generally, will be facing outwardly from each other, with the motors being in the center of anti-torque matrix 110. Generally, the motors will be co-axial, however, in certain embodiments the motors do not have to be co-axial. Further, while FIGS. 1 and 2 illustrate anti-torque matrix 110 are being in the form of a 3 by 3 matrix, that is generally rhomboid in shape, the skilled artisan will recognize that anti-torque matrix 110 can have any shape and include 2, 3, 4, 5, 6, 7, 8, 9, 10, 11, 12, 13, 14, 15 or more motors, which motors could also be in co-axial pairs. Further, the anti-torque matrix 110 can have any shape, such as round, oval, crescent-shaped, J-shaped, diagonal, square, rectangular, triangular, pentagonal, hexagonal, polygonal, rhomboid, trapezoid, X-shaped, Y-shaped, or kite shaped, For example, the first mode of helicopter operation is a hover mode, which is typically a mode in which helicopter 100 is sitting on or about the ground with anti-torque matrix 110 provides thrust from the one or more fixed or variable blade pitch motors 112a-112i when helicopter 100 is operating in slow speed flight. In this orientation, the anti-torque matrix 110 can provide maneuverability and trim to the helicopter operation. During hover, the direction of thrust of the one or more fixed or variable blade pitch motors 112a-112i of anti-torque matrix 110 can be in opposing directions, for example, one subset of motors can direct their thrust in one direction, while another subset can be directed in the opposite direction to provide finer rotational control to helicopter 100. Of course, the speed of the individual motors can also be varied, under control of a logic in a flight control computer that calculates the position of anti-torque matrix 110 during transition to and from the first to the second mode of operation and for independently controlling individual fan speeds to position the matrix for optimum thrust angle, as well as optimum thrust magnitude.

In a second mode of operation, anti-torque matrix 110 is oriented substantially off-plane with tail boom 108 of helicopter 100 during a second mode of helicopter operations that is different from the first mode. For example, the second mode of helicopter operation is a flight mode (e.g., a low to high-speed forward flight mode). In the flight mode, the orientation of anti-torque matrix 110 is changed from being substantially co-planar with tail boom 108 to being non-planar. For example, anti-torque matrix 110 can be substantially perpendicular with the plane of tail boom 108, by pivoting about pivot. Alternatively, the orientation of anti-torque matrix 110 can be anywhere between co-planar and perpendicular relative to tail boom 108.

FIGS. 3A-3F and FIGS. 4A-4F show several exemplary variations of matrix patterns of variable speed motors that provide high efficiency and reduced overall size. The skilled artisan will recognize that there are an infinite number of possible variations of number of rotors and pattern of rotor positions when using 2, 3, 4, 5, 6, 7, 8, 9, 10, 11, 12, 13, 14, 15 or more electric and/or hydraulic motors. Of course, the different motors can be ducted in groups of 2, 3, 4, 5, or more, again, having a variety of shapes and sizes. In addition, different motors may be different sizes and the blades may vary in size throughout the matrix.

Figure 3A:
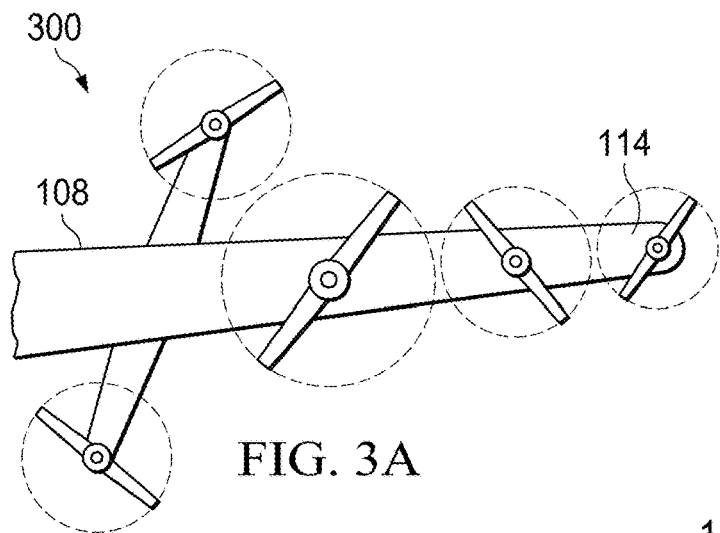
FIGS. 3A-3F illustrate various schematic diagrams of exemplary anti-torque matrices.
Figure 3B:
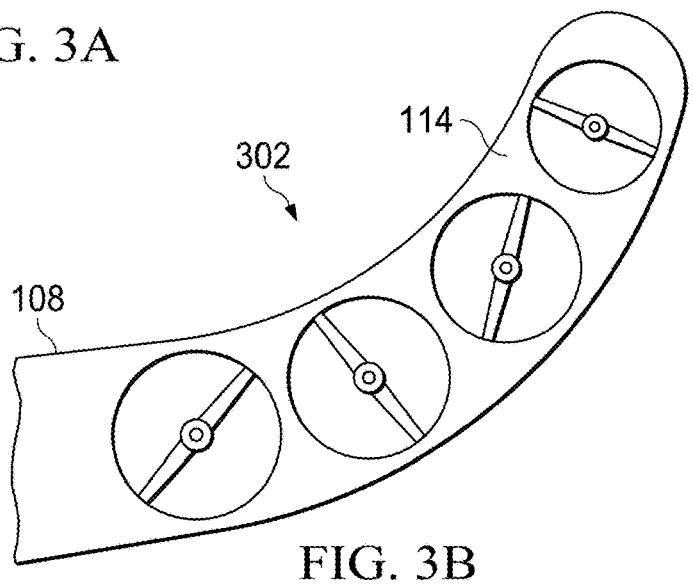
Figure 3C:
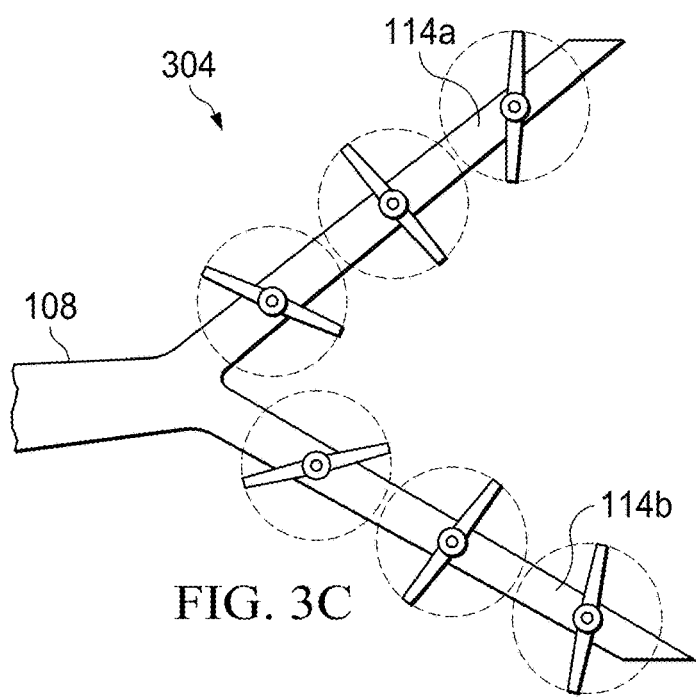
Figure 3D:
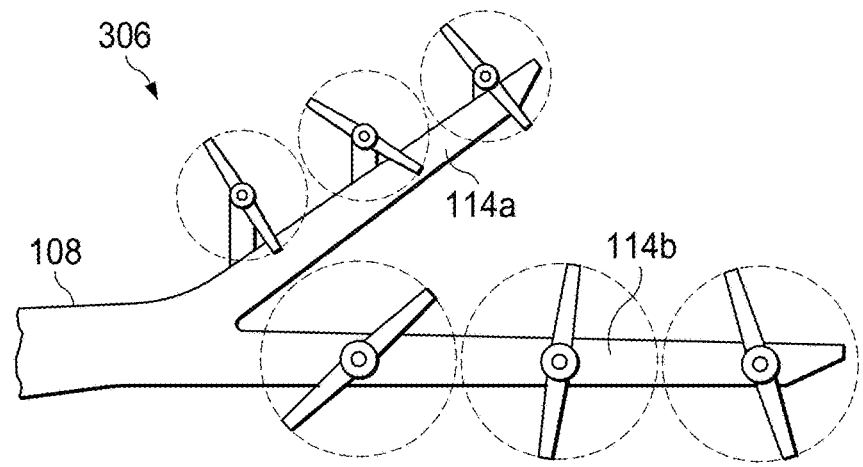
Figure 3E:
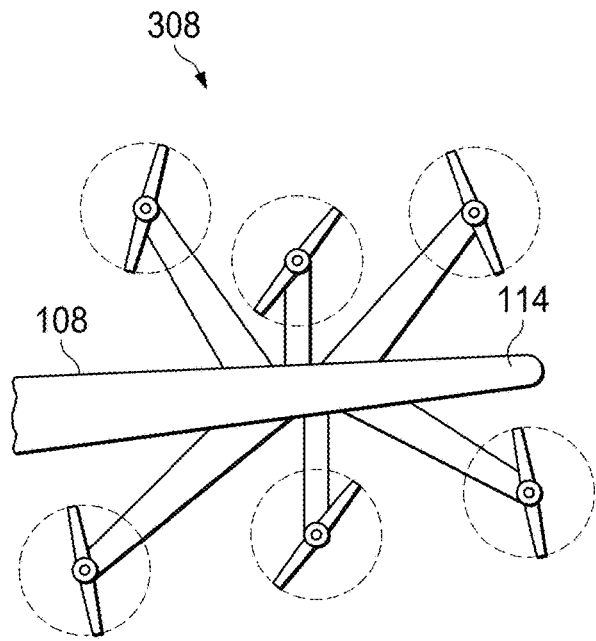
Figure 3F:
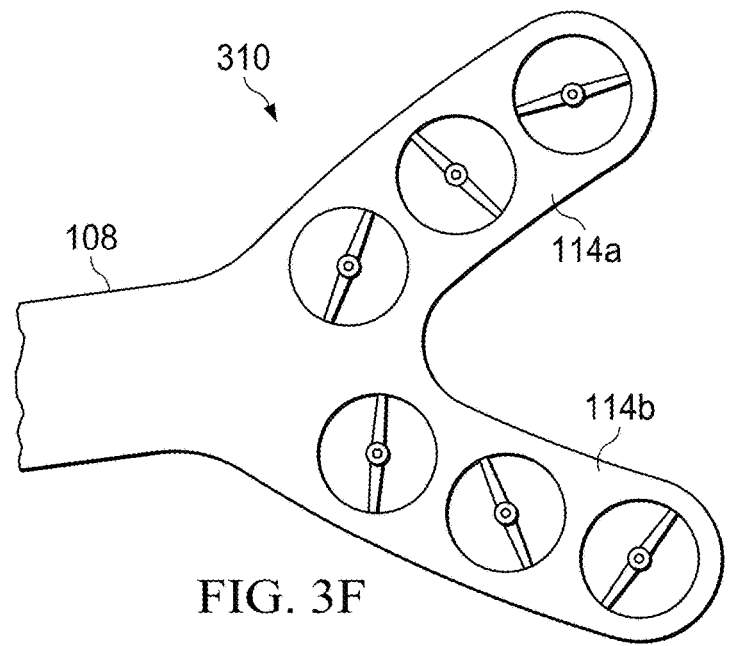
Figure 4A:
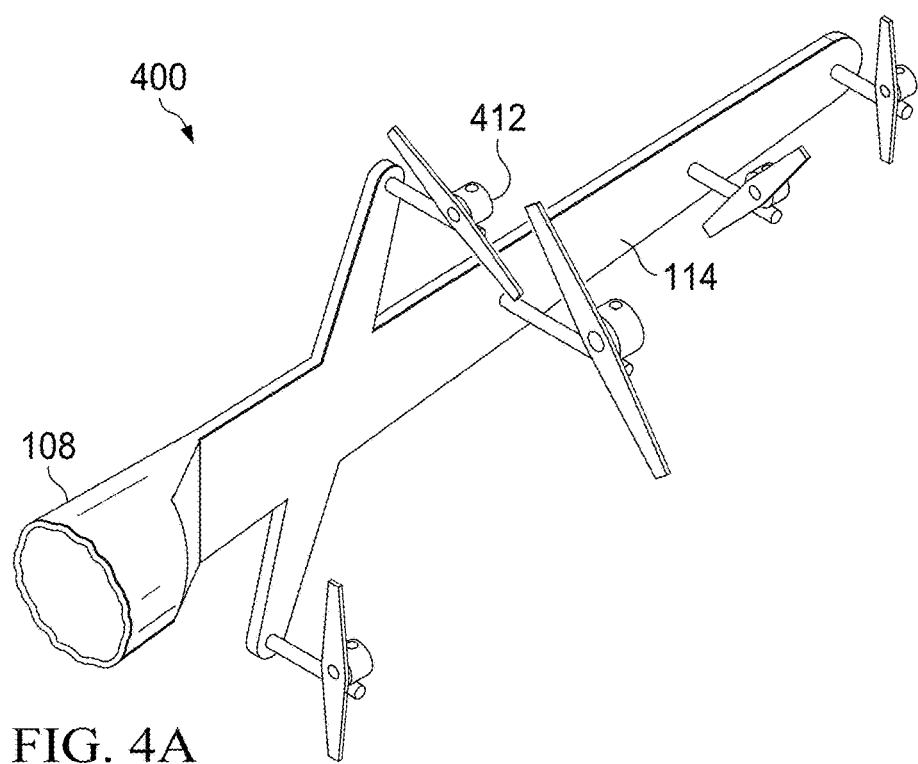
FIGS. 4A-4F illustrate additional schematic diagrams of exemplary anti-torque matrices.
Figure 4B:
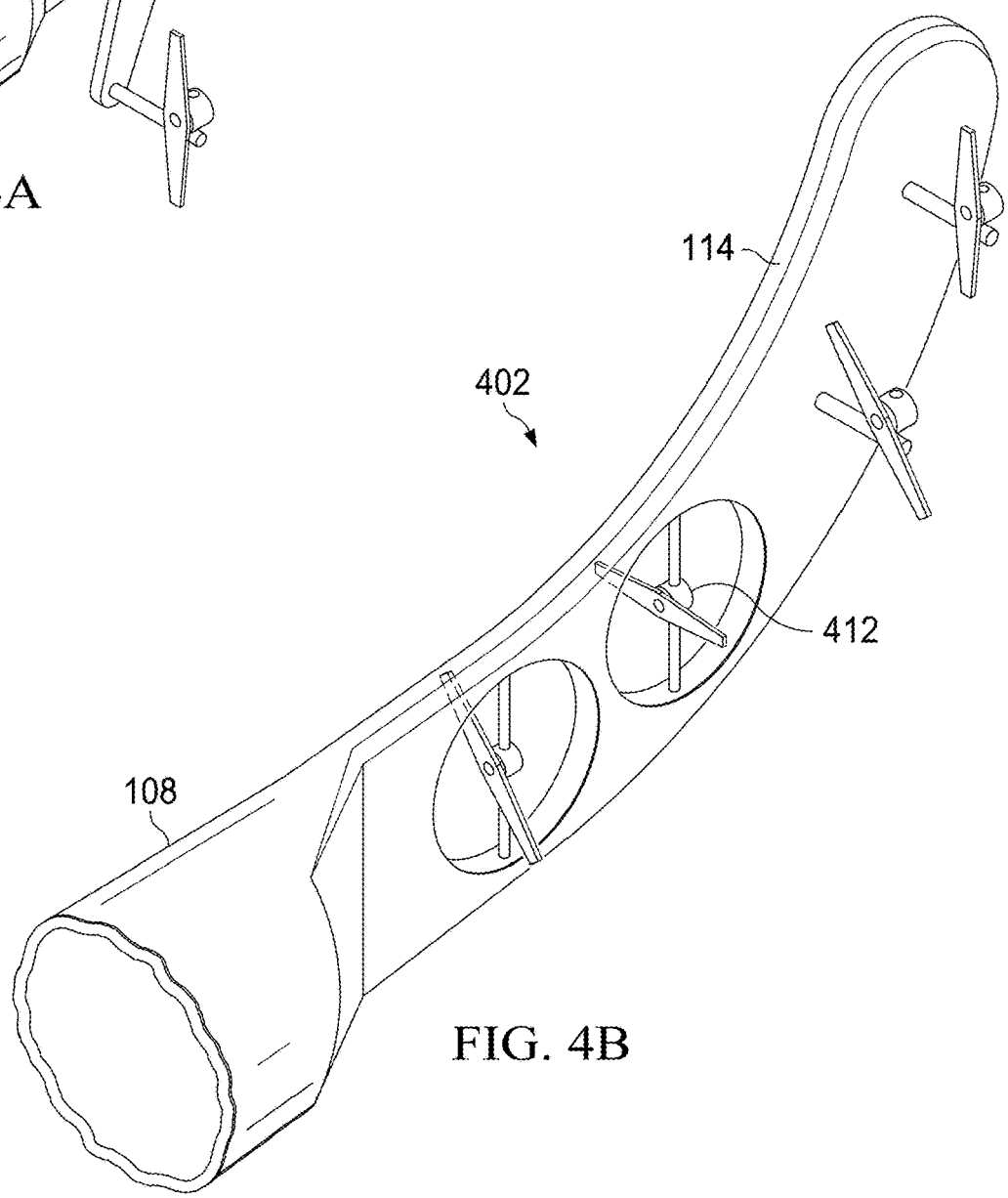
Figure 4C:
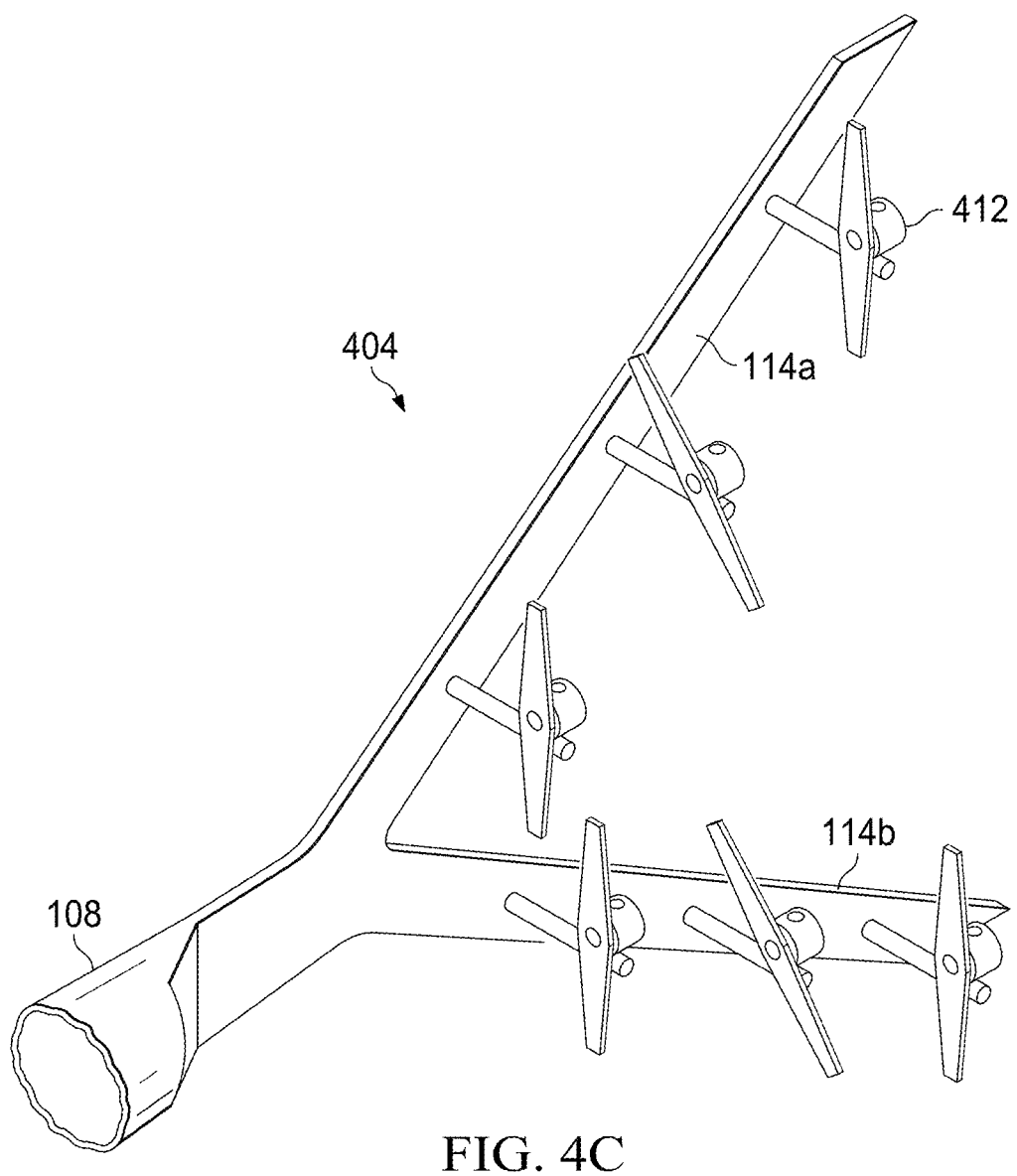
Figure 4D:
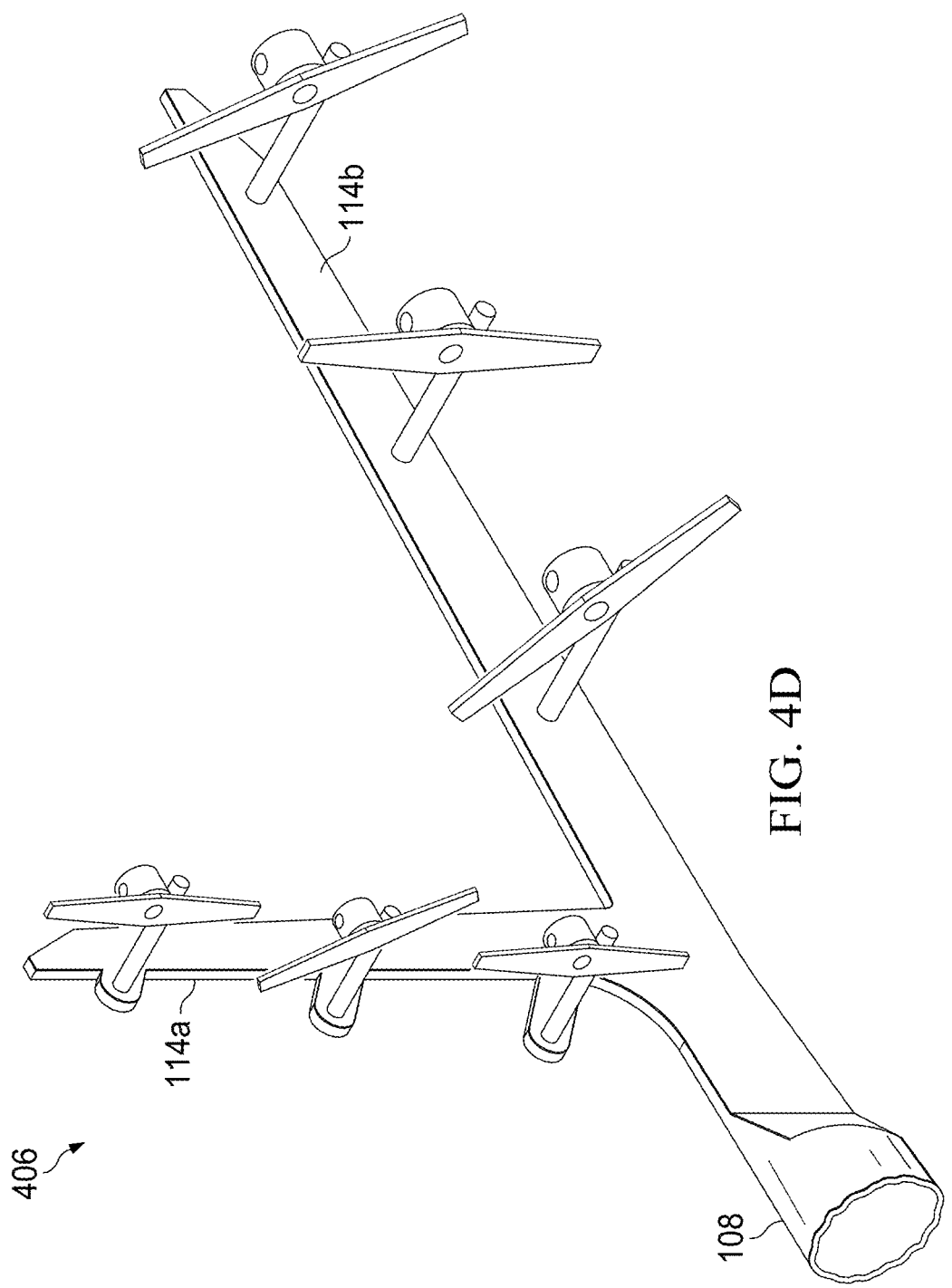
Figure 4E:
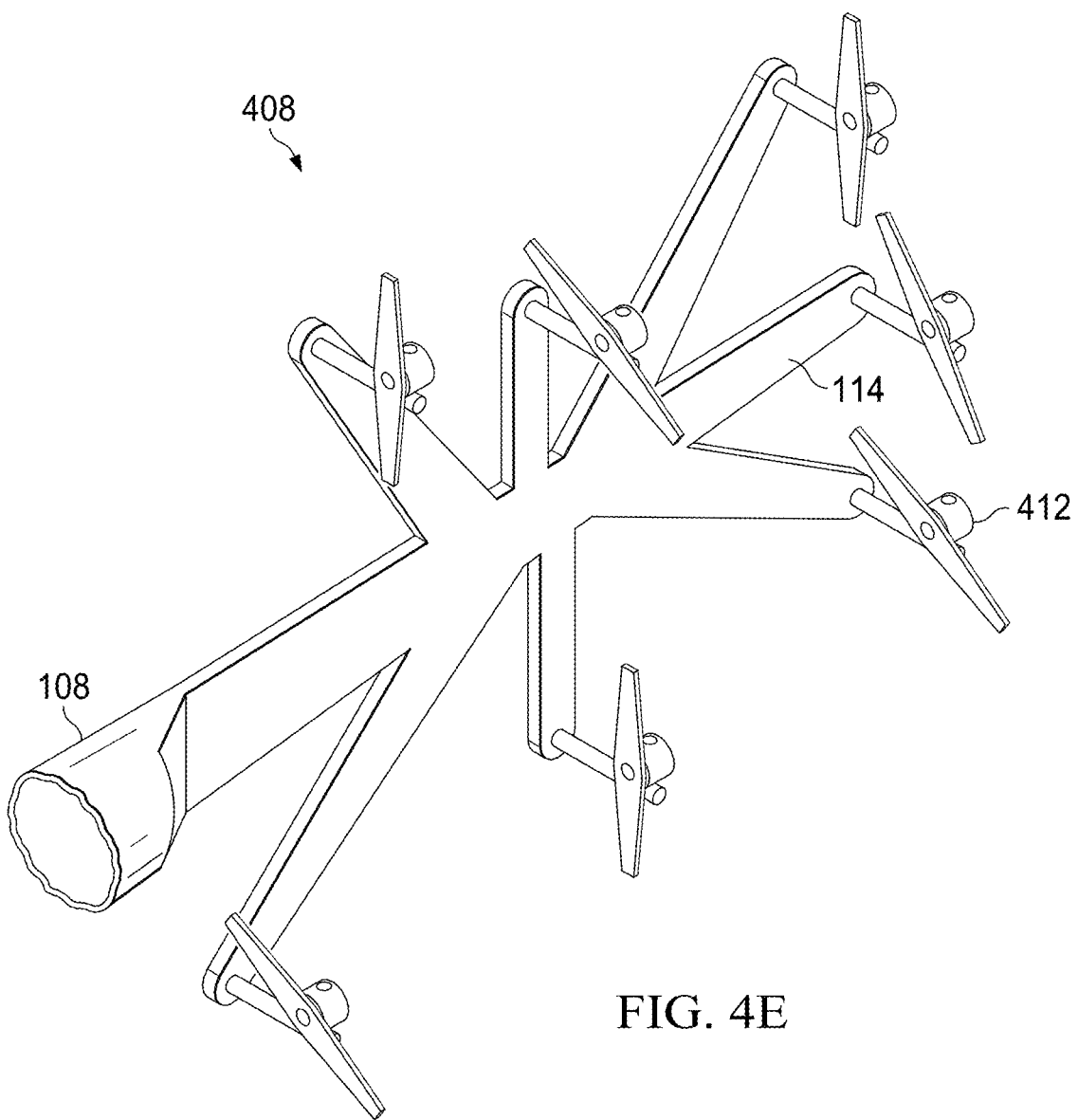
Figure 4F:
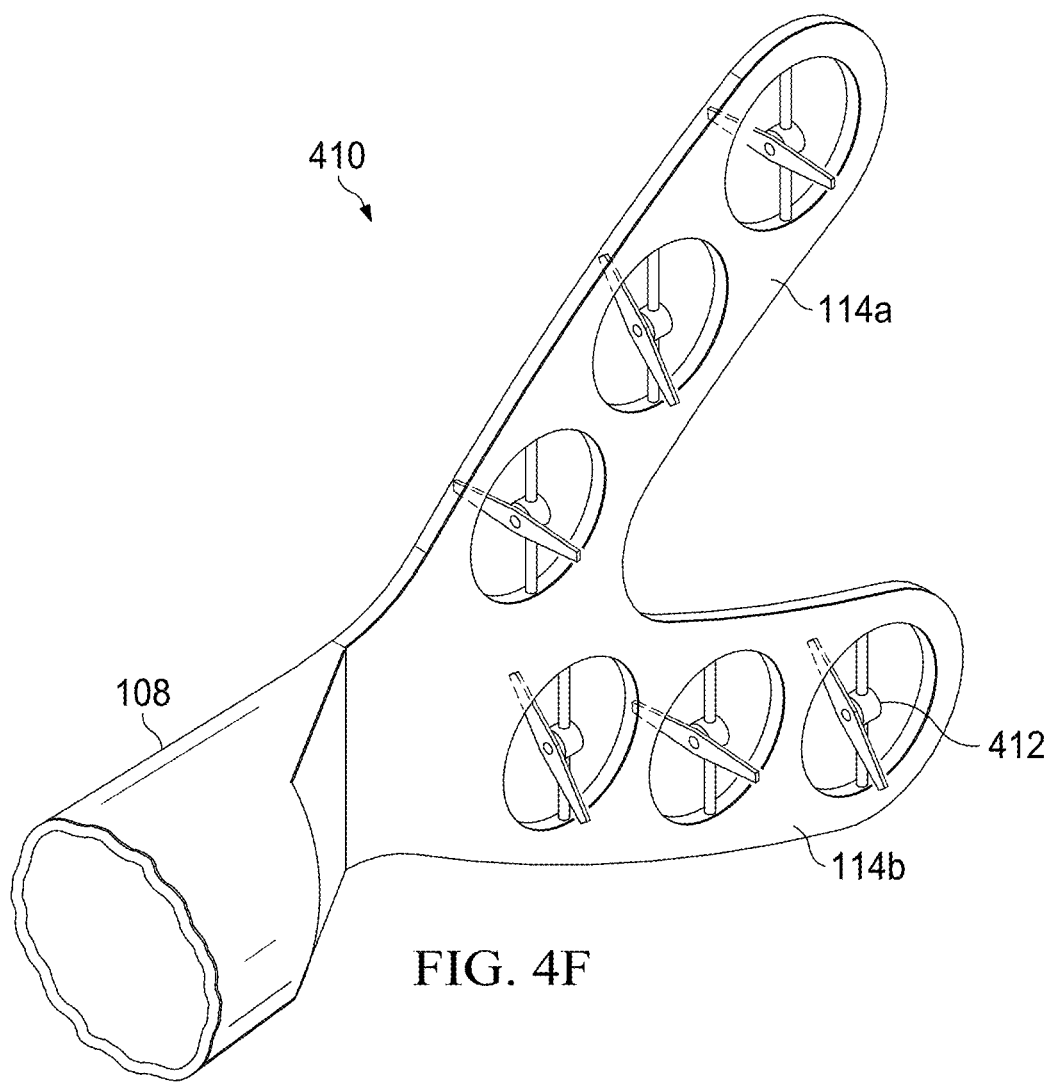

FIGS. 3A to 3F, and 4A to 4F show various schematic diagrams of anti-torque matrix with tail boom 108 of helicopter 100. In FIG. 3A anti-torque matrix 300 is mounted to tail boom 108 having a surface 114 and is depicted as having various electric motors and fixed pitch angle blades that are of different sizes and generally forming a triangular shape, with the apex of the triangle facing aft and anti-torque matrix 110 being generally vertical. FIG. 4A shows the same configuration as in FIG. 3A, in this case anti-torque matrix 400 is depicted with a pivot 412. FIG. 3B shows an anti-torque matrix 302 is mounted to, or integral with, tail boom 108 having a surface 114 and is depicted as having a J-shape in which the various electric motors and fixed pitch angle blades have about the same size and are ducted. FIG. 4B shows a same configuration as in FIG. 3B, in this case anti-torque matrix 402 is depicted with a pivot 412. However, in this configuration anti-torque matrix 402 shows a combination of in-plane variable speed motors and off-plane variable speed motors, which can also apply to all the configurations shown herein. FIG. 3C shows an anti-torque matrix 304 is mounted to tail boom 108 having surfaces 114a and 114b and is depicted as having various electric motors and fixed pitch angle blades that are about the same size and generally form a triangular shape with the apex of the triangle facing forward. In FIG. 3C, anti-torque matrix 304 oriented off-plane with tail boom 108 of helicopter 100, that is, anti-torque matrix 304 has been rotated on a Z-axis that passes between upper end axis 114a and lower end axis 114b perpendicular from an in-plane orientation. In some implementations, anti-torque matrix 304 can be pivoted on a horizontal X-axis to provide yaw control of helicopter 100. FIG. 4C shows the same configuration as in FIG. 3C, in this case anti-torque matrix 404 is depicted with a pivot 412. FIG. 3D shows an anti-torque matrix 306 is mounted to tail boom 108 having surfaces 114a and 114b and is depicted as having various electric motors and fixed pitch angle blades that are about the same size and generally form a triangular shape with the apex of the triangle facing forward, however, in this embodiment the fork is horizontal. FIG. 4D shows the same configuration as in FIG. 3D, in this case anti-torque matrix 406 is depicted with a pivot 412. FIG. 3E shows an anti-torque matrix 308 is mounted to tail boom 108 having a surface 114 and is depicted as having various electric motors and fixed pitch angle blades that are about the same size and generally form an X-shape, with two additional motors. FIG. 4E shows the same configuration as in FIG. 3E, in this case anti-torque matrix 408 is depicted with a pivot 412. FIG. 3F shows an anti-torque matrix 310 is mounted to tail boom 108 having surfaces 114a and 114b and is depicted as having various electric motors and fixed pitch angle blades that are about the same size and generally form a crescent shape with the apex of the crescent facing forward. FIG. 4F shows the same configuration as in FIG. 3F, in this case anti-torque matrix 410 is depicted with a pivot 412.

FIGS. 4A to 4F shows that a pivoting mechanism can be included with one or more of the fixed pitch rotors in anti-torque matrix 400-410 at the end of tail boom 108 of helicopter 100. In some implementations, the pivoting mechanism can be electric, or can even be a bell crank system and can include a pulley cable system connected to the bell crank system. The pivoting mechanism can be controlled by an operator of helicopter 100 to orient anti-torque matrix 400-410 substantially in-plane with tail boom 108 of helicopter 100 during a first mode of helicopter operation, and to orient anti-torque matrix 400-410 substantially off-plane with tail boom 108 of helicopter 100 during a second mode of helicopter operation that is different from the first mode. In a fly-by-wire configuration, the pivoting mechanism can be controlled by a logic in a flight control computer that calculates the position of anti-torque matrix 400-410 during transition to and from the first to the second mode of operation and for independently controlling individual fan speeds to position the matrix for optimum thrust angle, as well as optimum thrust magnitude.

FIG. 5A is an rear, end view of anti-torque matrix 110 depicted in this version as sitting on tail boom 108, wherein anti-torque matrix 110 can be included at the end of tail boom 108 comprises two parallel sets of variable speed motors and fixed or variable angle blades 502a to 502f, that are shown within the body of anti-torque matrix 110, wherein variable speed motors 502a to 502f are co-axial and the blades are outwardly facing. Each pair of coaxial motors (502a and 502f, 502b and 502e, and 502c and 502d) is depicted as being within a duct 504a, 504b, 504c, respectively, and shows three pairs of motors that are internal to the tail boom. The skilled artisan will recognize that if anti-torque matrix 110 has 6, 9, 12, or other number of pairs of motors, the end view only permits showing, in this version, the closest motors (502a-502f), however, additional pairs of motors and ducts can also be found forward from these motors.

FIG. 5B is an rear, end view of anti-torque matrix 110 depicted in this version as sitting on tail boom 108, wherein anti-torque matrix 110 can be included at the end of tail boom 108 comprises two parallel sets of variable speed motors and fixed or variable angle blades 502a to 502f, that are shown to extend from mast 506 of anti-torque matrix 110, wherein the variable speed motors 502a to 502f are co-axial and the blades are outwardly facing. Each pair of coaxial motors (502a and 502f, 502b and 502e, and 502c and 502d) is depicted as being within a duct 504a, 504b, 504c, respectively, and shows three pairs of motors. The skilled artisan will recognize that if anti-torque matrix 110 has 6, 9, 12, or other number of pairs of motors, the end view only permits showing, in this version, the closest motors (502a-502f), however, additional pairs of motors and ducts can also be found forward from these motors.

Figure 6A:
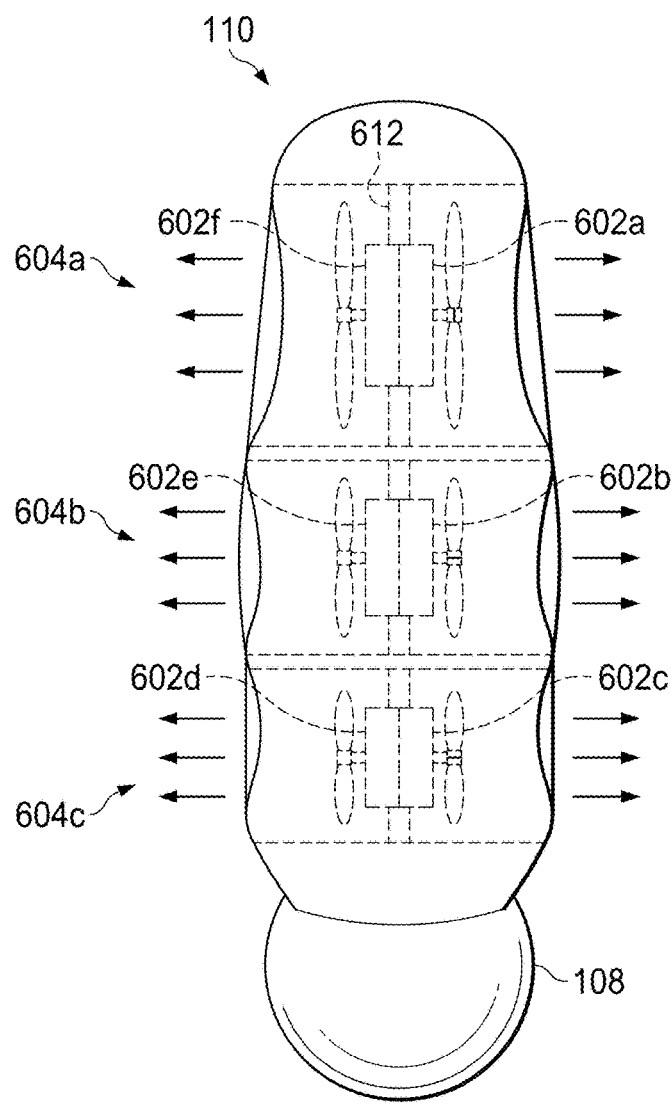
FIGS. 6A and 6B illustrate variants of co-axially positioned motors with outwardly facing blades in another exemplary electric distributed propulsion system.
Figure 6B:
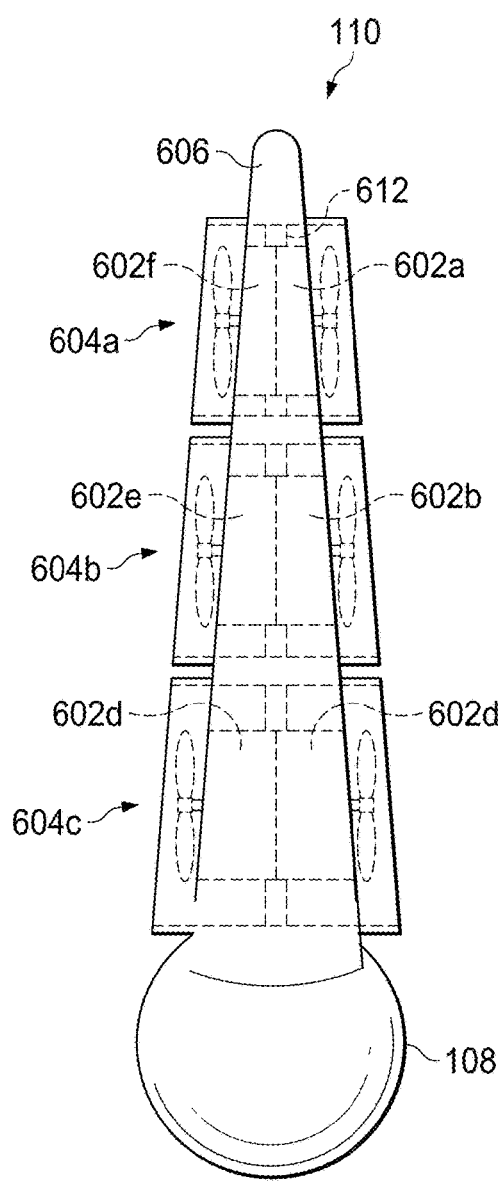

FIGS. 6A and 6B show the same configuration as FIGS. 5A and 5B, but in this configuration motors 602a-602f are connected to a pivoting mechanism 612. The pivoting mechanism 612 can be electric, mechanical, or can even be a bell crank system and can include a pulley cable system connected to the bell crank system. In the configurations shown in FIGS. 6A and 6B, the aft portion of anti-torque matrix 110 is fitted with rearward grooves or openings in the aft portion of the tail rotor, for example, at mast 606, to add thrust to the rotorcraft. The pivoting mechanism can be controlled by an operator of helicopter 100 to orient anti-torque matrix 110 substantially in-plane with tail boom 108 of helicopter 100 during a first mode of helicopter operation, and to orient anti-torque matrix 110 substantially off-plane with tail boom 108 of helicopter 100 during a second mode of helicopter operation that is different from the first mode. In a fly-by-wire configuration, the pivoting mechanism can be controlled by a logic in a flight control computer that calculates the position of anti-torque matrix 110 during transition to and from the first to the second mode of operation and for independently controlling individual fan speeds to position the matrix for optimum thrust angle, as well as optimum thrust magnitude.

Figure 7:
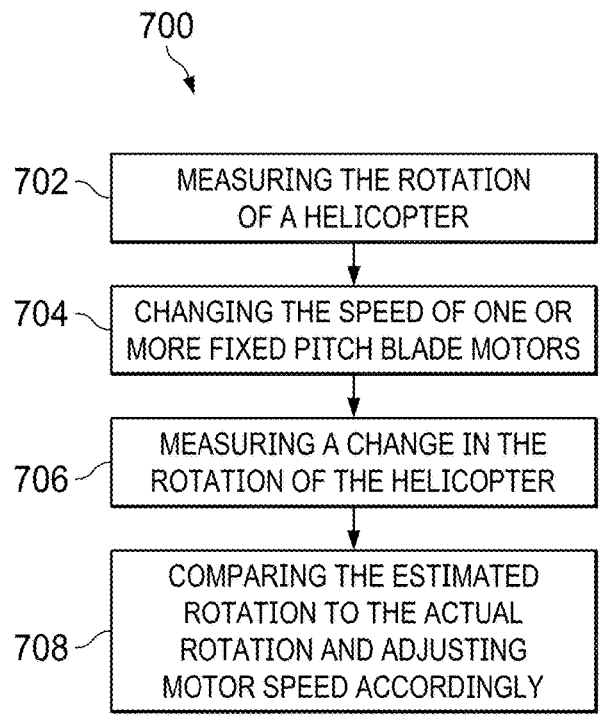
FIG. 7 is a flowchart of an exemplary control logic for controlling the rotation of a helicopter that comprises an electric distributed propulsion system anti-torque system.

FIG. 7 shows a flowchart of a control logic 700 for controlling the rotation of a helicopter that comprises the variable speed motors and fixed or variable angle blades in a matrix pattern. In block 702, control logic 700 that can be, e.g., in a flight control computer, receives measurements of the rotation of the helicopter from, e.g., a rotation sensor. In block 704, control logic 700 changes the speed of the one or more variable speed motors to increase torque or anti-torque to a desired rotation, which rotation can include no rotation. Control logic 700 can include looking up a table of known or estimated torque calculations or formulas for each of the variable speed motors depending on the size of the motor, blade, or position in the matrix. The position of the variable speed motors in the matrix will significantly affect their individual effect on the rotation of the helicopter. For example, assuming all the variable speed motors and blades are of equivalent size and power, then the variable speed motors and blades that are at the aft-most position will have the greatest effect on torque, while variable speed motors and blades that are fore from other motors will have less overall torque, assuming the same speed. As such, control logic 700 can look-up the estimated or measured effect on torque for each individual motor (or pairs of motors if co-axial), and then increase or decrease the speed to adjust the rotation of the helicopter. In block 706, control logic 700 receives data from the rotation sensor that reflects actual helicopter rotation and in block 708, compares the estimate or calculated rotation of the helicopter versus actual rotation and can then adjust motor speed to change the speed of one or more of the variable speed motors and blades to control rotation, if any.

Figure 8:
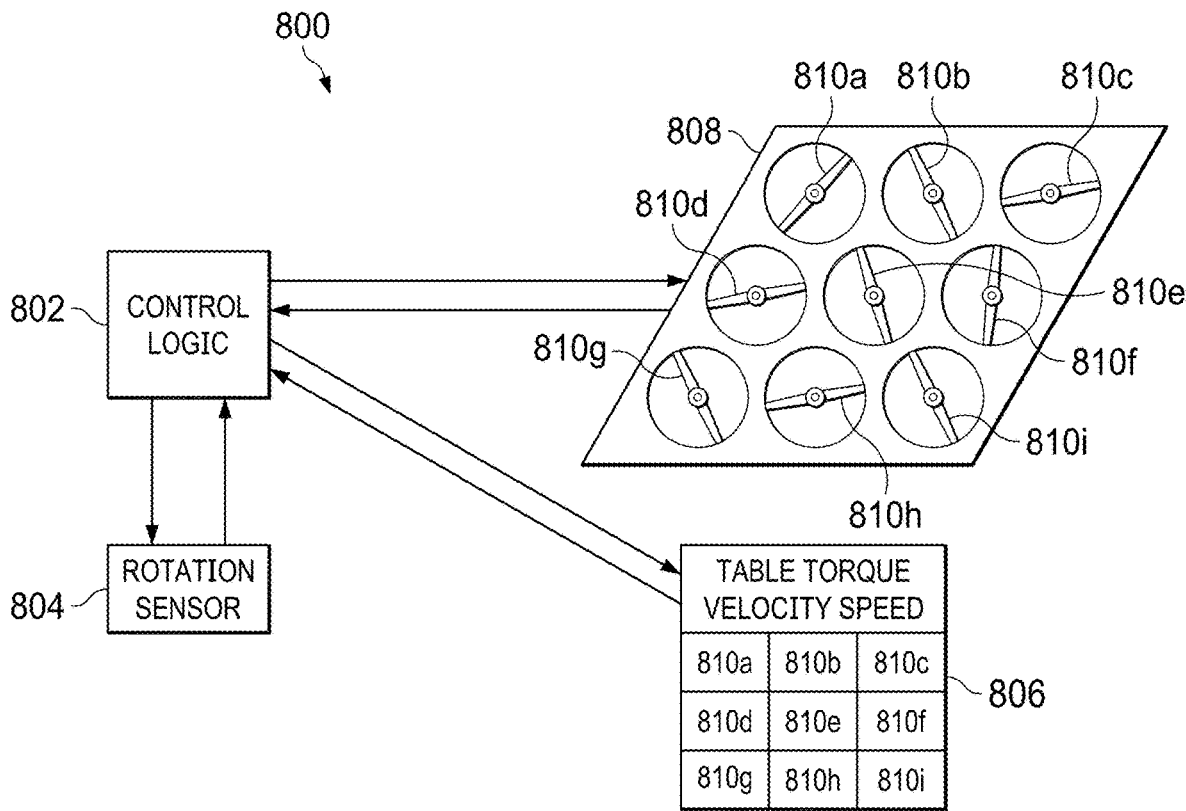
FIG. 8 illustrates an exemplary rotation control system for use with the plurality of fixed or variable pitch blade variable speed motors arranged in a first or a first and a second electric distributed propulsion matrix.

FIG. 8 shows a rotation control system 800 for use with the plurality of variable speed motors arranged in a first or a first and a second matrix. A control logic 802 is connected to a rotation sensor 804. Control logic 802 is also connected and controls the speed of the one or more fixed or variable pitch blade variable speed motors 810a-810i that are part of anti-torque module 808. Control logic 802 is also connected to a table 806 that includes the calculated torque versus speed for each of the one or more variable speed motors 810a-810i. Control logic 802 looks up estimated torques for the motors to adjust the speed of the motors based on a user-input for overall helicopter rotation (if any), then measures actual rotation, and finally adjusts the speed and torque of the one or more variable speed motors 810a-810i during flight operations.

Figure 9:
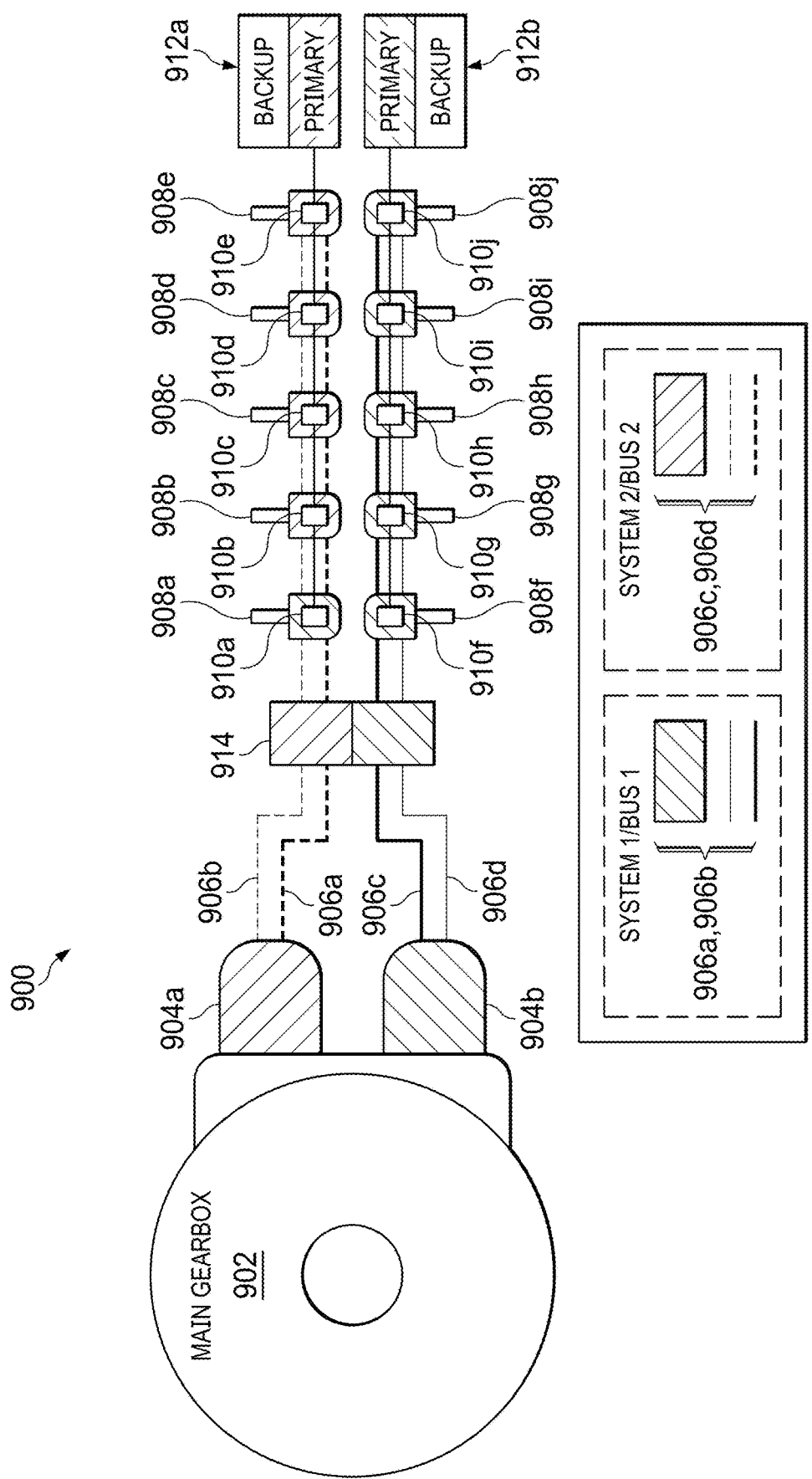
FIG. 9 illustrates an exemplary electric distributed propulsion anti-torque system.

FIG. 9 illustrates an exemplary electric distributed propulsion anti-torque system 900. In this configuration, electric distributed propulsion anti-torque system 900 is an electric distributed propulsion anti-torque with dual flight control computers (FCC), dual power buses, and individual speed control units. Electric distributed propulsion anti-torque system 900 has a gearbox 902 that is connected to first and second generators 904a, 904b. Generator 904a is electrically connected via two separate system/buses 906a, 906b to electric motors 908a-908e, each of which has individual speed controls 910a-910e. Each of system/buses 906a, 906b and 906c, 906d is shown in the legend below to show the electrical connection from each of the first and second generators 904a, 904b. Generator 904b is electrically connected via two separate system/buses 906c, 906d to electric motors 908f-908j, each of which has individual speed controls 910f-910j. Electrical generators 904a, 904b are connect to a power management unit 914 that provide redundant power and is controlled via yaw control computers 912a, 912b (which can be the flight control computer). Each of system/buses 906a, 906b that connect to yaw control computers 912a, 912b can each act as a primary or a back-up for the other system/bus, thus providing complete, double redundant power to electric motors 908a-908e or electric motors 908f-908j. The skilled artisan will recognize that the electrical connections described herein can be used to control electrical power and control to hydraulic motors.

Figure 10:
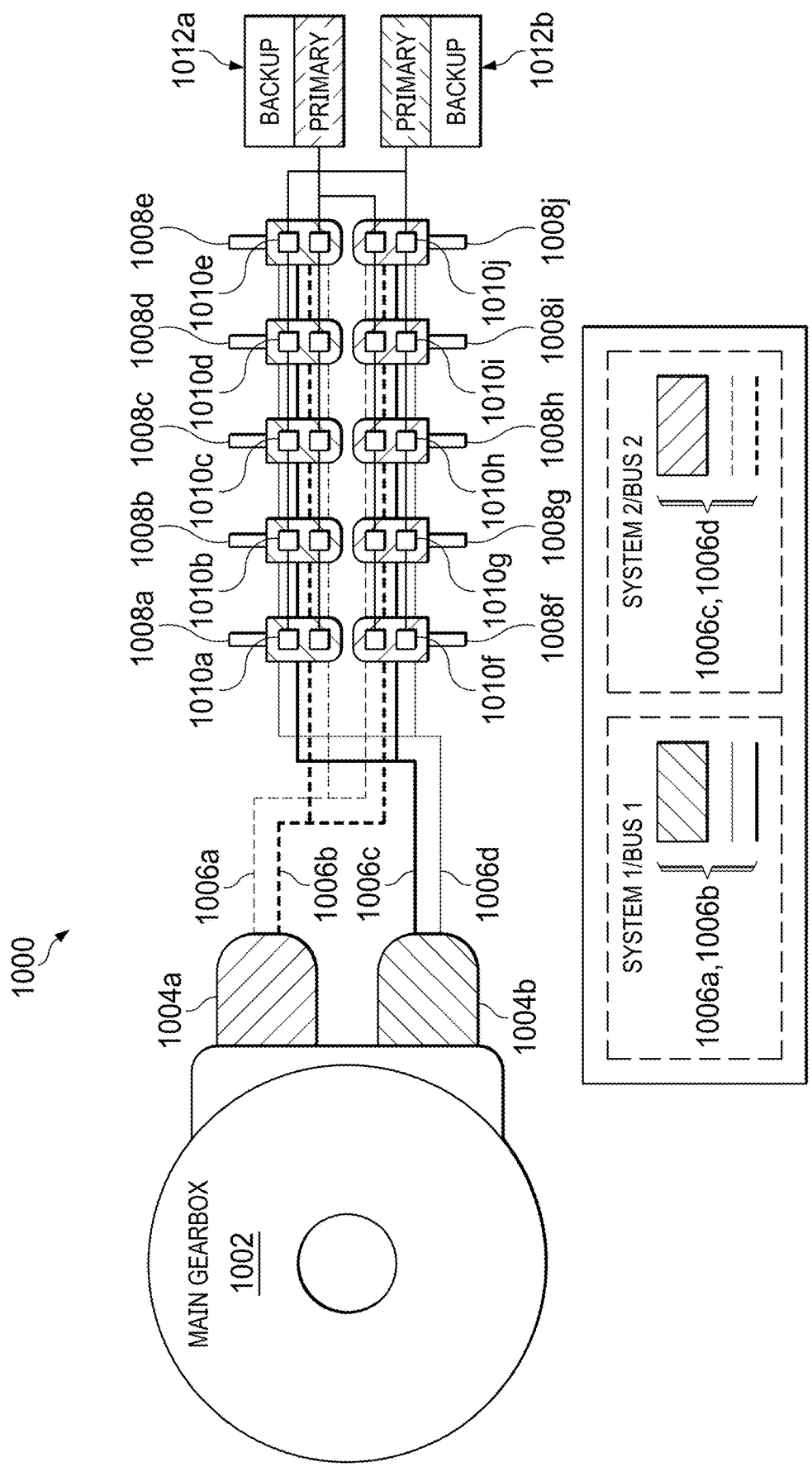
FIG. 10 illustrates another electric distributed propulsion anti-torque system.

FIG. 10 illustrates another electric distributed propulsion anti-torque system 1000. In this configuration, electric distributed propulsion anti-torque system 1000 is an electric distributed propulsion anti-torque with dual flight control computers (FCC), dual power buses, and dual speed control units. Electric distributed propulsion anti-torque system 1000 has a gearbox 1002 that is connected to first and second generators 1004a, 1004b. Generator 1004a is electrically connected via two separate system/buses 1006a, 1006b to electric motors 1008a-1008e, each of which has individual speed controls 1010a-1010e. Generator 1004b is electrically connected via two separate system/buses 1006c, 1006d to electric motors 1008a-1008j, each of which has individual speed controls 1010f-1010j. System/buses 1006a and 1006b are directly connected to all electric motors 1008a-1008j, and are controlled by yaw control computers 1012a, 1012b (which can be the flight control computer), thereby providing double, redundant power and control to each of electric motors 1008a-1008j. Each of system/buses 1006a, 1006b that connect to yaw control computers 1012a, 1012b can each act as a primary or a back-up for the other system/bus, thus providing complete, double redundant power to electric motors 1008a-1008j. This configuration is shown without a separate power management system, but the skilled artisan will recognize that these systems are not mutually exclusive, but would provide for both a power management system and the double, redundant connections to each of the electric motors. The skilled artisan will recognize that the electrical connections described herein can be used to control electrical power and control to hydraulic motors.

Figure 11:
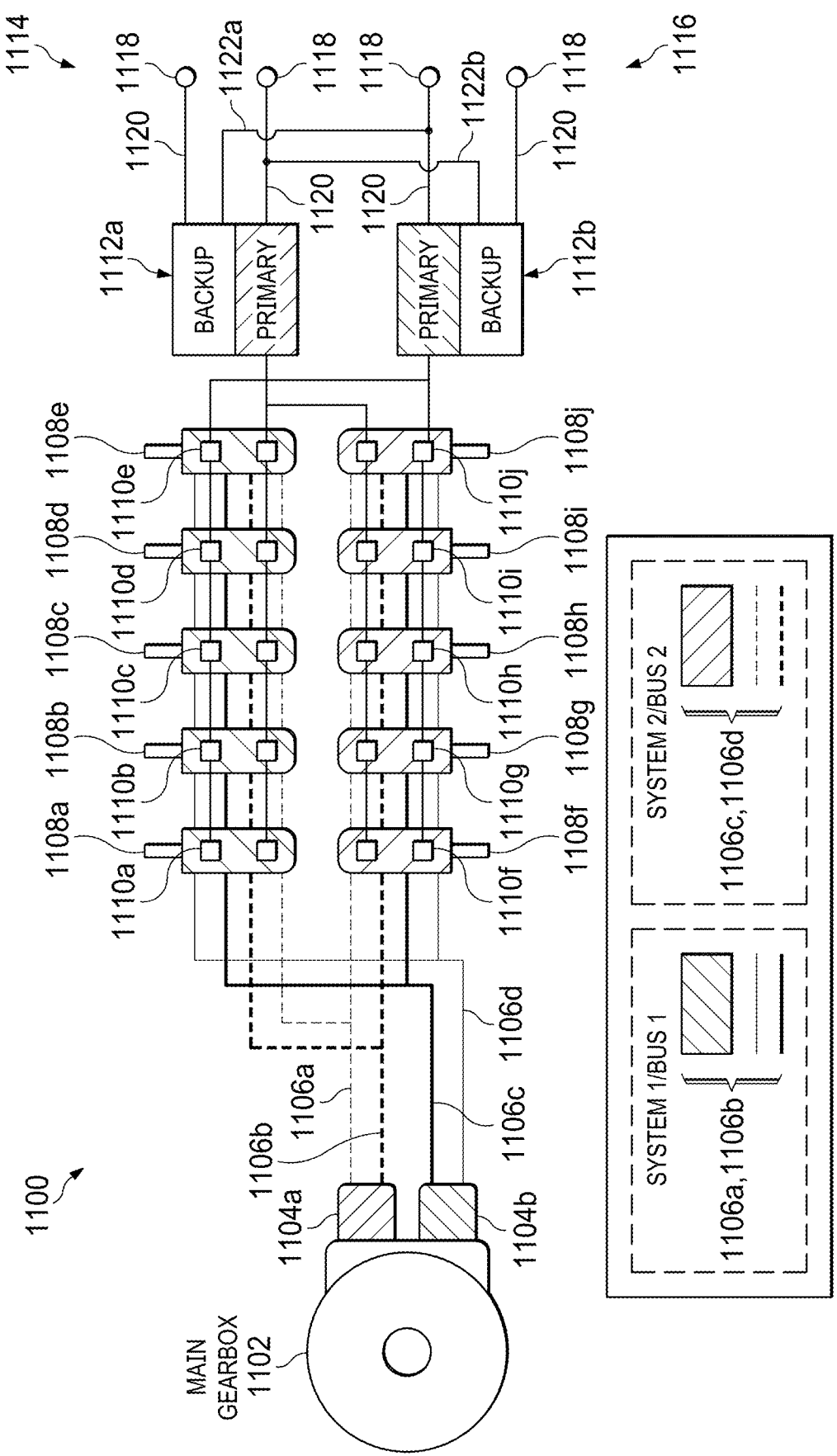
FIG. 11 illustrates an exemplary electric distributed propulsion system utilizing redundant control inputs.

FIG. 11 illustrates an exemplary architecture of an electric distributed propulsion system 1100, which may be implemented as an anti-torque system. In this configuration, electric distributed propulsion system 1100 has dual controllers, dual power buses, and dual speed control units and further includes dual channel input. Electric distributed propulsion system 1100 has a gearbox 1102 that is connected to first and second generators 1104a, 1104b. Generator 1104a is electrically connected via two separate system/buses 1106a, 1106b to fixed or variable pitch blade electric motors 1108a-1108e, each of which may have individual speed controls 1010a-1010e. Generator 1104b is electrically connected via two separate system/buses 1106c, 1106d to electric motors 1108a-1108j, each of which has individual speed controls 1110f-1110j. System/buses 1106a and 1106b are directly connected to all electric motors 1108a-1108j, and are controlled by controllers 1112a, 1112b (which can be the flight control computer), thereby providing double, redundant power and control to each of electric motors 1108a-1108j. Each of system/buses 1106a, 1106b that connect to controllers 1112a, 1112b can each act as a primary or a back-up for the other system/bus, thus providing complete, double redundant power to electric motors 1108a-1108j. This configuration is shown without a separate power management system, but the skilled artisan will recognize that these systems are not mutually exclusive, but would provide for both a power management system and the double, redundant connections to each of the electric motors. The skilled artisan will recognize that the electrical connections described herein can be used to control electrical power and control to hydraulic motors.

System 1100 includes dual channels 1114 and 1116 in communication between pilot input sensors generally designated 1118 and signal controllers 1112a, 1112b. Each channel 1120 is independent of the other channels 1120. Dual channels 1114 and 1116 include an additional channel 1122a and 1122b to provide redundant communication to the controllers from the pilot input sensors. In this example, pilot input sensors 1118 includes four sensors to provide triple redundancy for each of the controllers. Pilot input sensors 1118 may include or consist of a triplex sensor. Additionally, system 1110 includes cross communication between all the motor control units and signal controllers. In some embodiments, each of the controllers, dual channels, and respective input sensors may be replaced with a flight control computer. The primary and backup controllers may have a cross-communication function for data exchange, whereby upon failure of one controller the other controller can perform command functions. System 11 is not limited to dual components and systems and is illustrative of redundant architectures.

Figure 12:
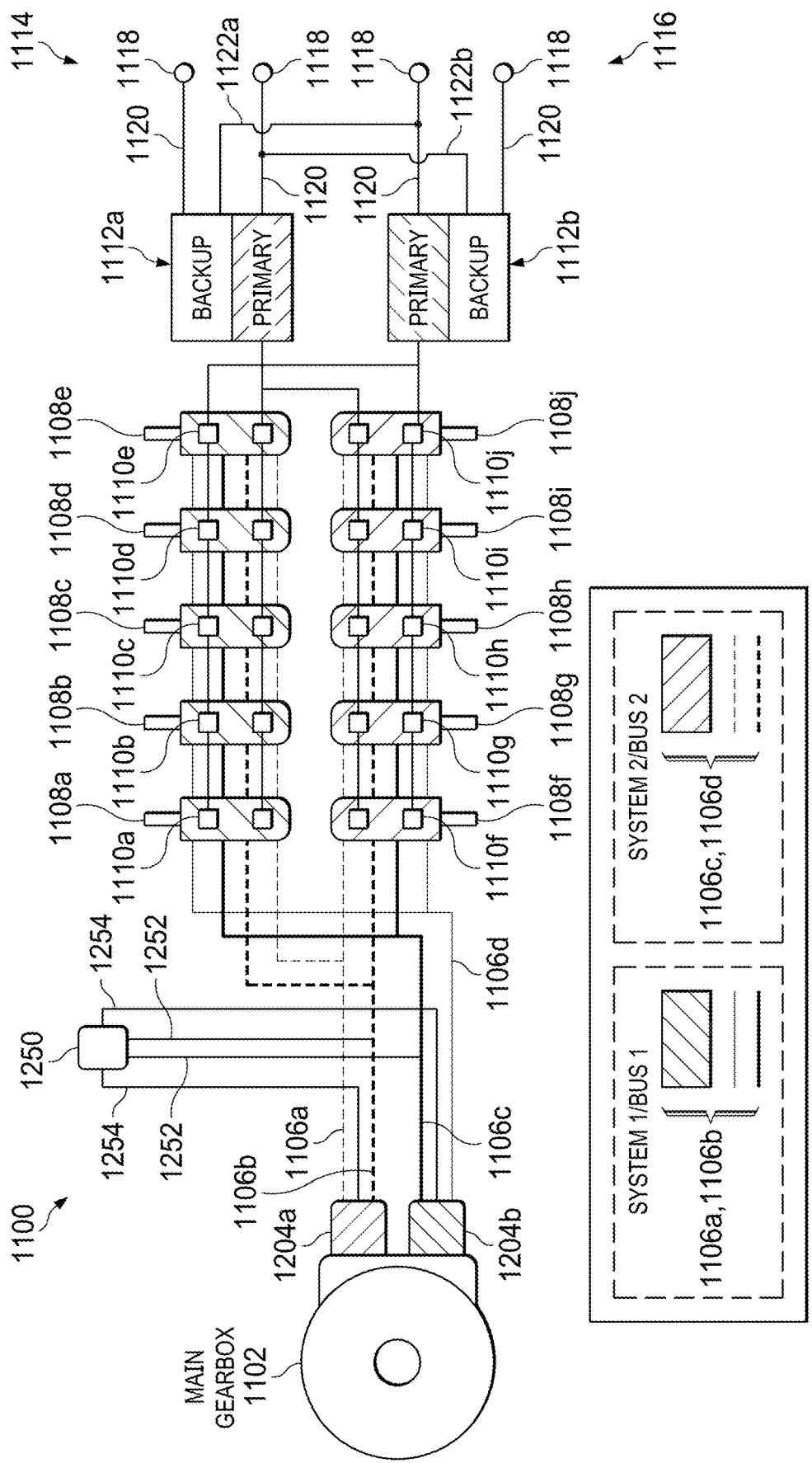
FIG. 12 illustrates an exemplary electric distributed propulsion system incorporating electric storage capabilities.

FIG. 12 illustrates another exemplary architecture of an electric distributed propulsion system 1200, which may be implemented as an anti-torque system. In this configuration, electric distributed propulsion anti-torque system 1200 includes dual controllers, dual power buses, and dual speed control units for redundant power and control. System 1200 is not limited to dual components and systems and is illustrative of redundant architectures. System 1200 is similar to system 1100 illustrated in FIG. 11 and further includes an electric storage device 1250, e.g., a battery or ultracapacitor. Electric storage device 1250 is electrically connected via first connections 1252 to the plurality of motors to receive and store motor regenerative power and to provide stored electricity to the motors when generator power is unavailable or to boost the motor output once it is above the available generator power or operation requires higher power responsiveness and also to provide power for other onboard electrical devices.

One or more of the generators maybe starter-generators or motor-generators. Electric storage device 1250 is electrically connected to the one or more starter- or motor-generators through second connections 1254. The starter or motor function may be powered with the stored electricity from storage device 1250 to start the engine, e.g. a turbine engine, by driving the engine until it rotates fast enough to support combustion. The starter or motor function may be used in accordance with some embodiments to drive the generator coils of one or more of the generators to generator and supply electricity to the motors, for example during an autorotation event. For example, stored electricity is communicate from stored electric storage device to a generator 1204*a* and/or 1204*b* to drive the gearbox and the generator coils. The generator power may be used to power the motors and other onboard electrical devices. The blades (fans) in electric distributed propulsion systems may be too small to support autorotation and thus one or more of the motors need to be electrically powered to provide the necessary thrust for a safe landing.

Figure 13:
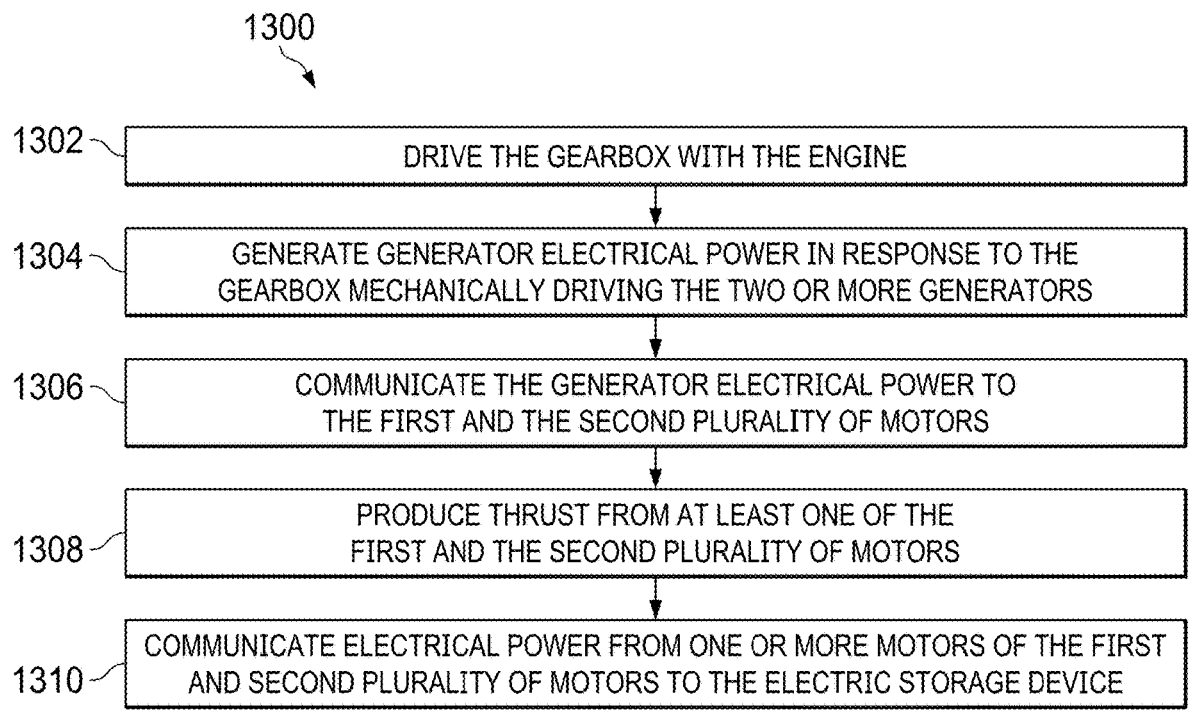
FIG. 13 illustrates an exemplary method of operating an aircraft with an electric distributed propulsion system.

FIG. 13 illustrates an exemplary method 1300 of operating an aircraft with an electric distributed propulsion system, described with reference to the other figures. At block 1302, a gearbox is driven by an engine. At block 1304, the gearbox mechanically drives a generator that generates generator electrical power. At block 1306, the generator electrical power is communicated to the plurality of fixed or variable pitch blade motors, which at block 1308 produce thrust. At block 1310, regenerative electric power from one or more of the fixed or variable pitch blade motors is communicated to an electric storage device.

Figure 14:
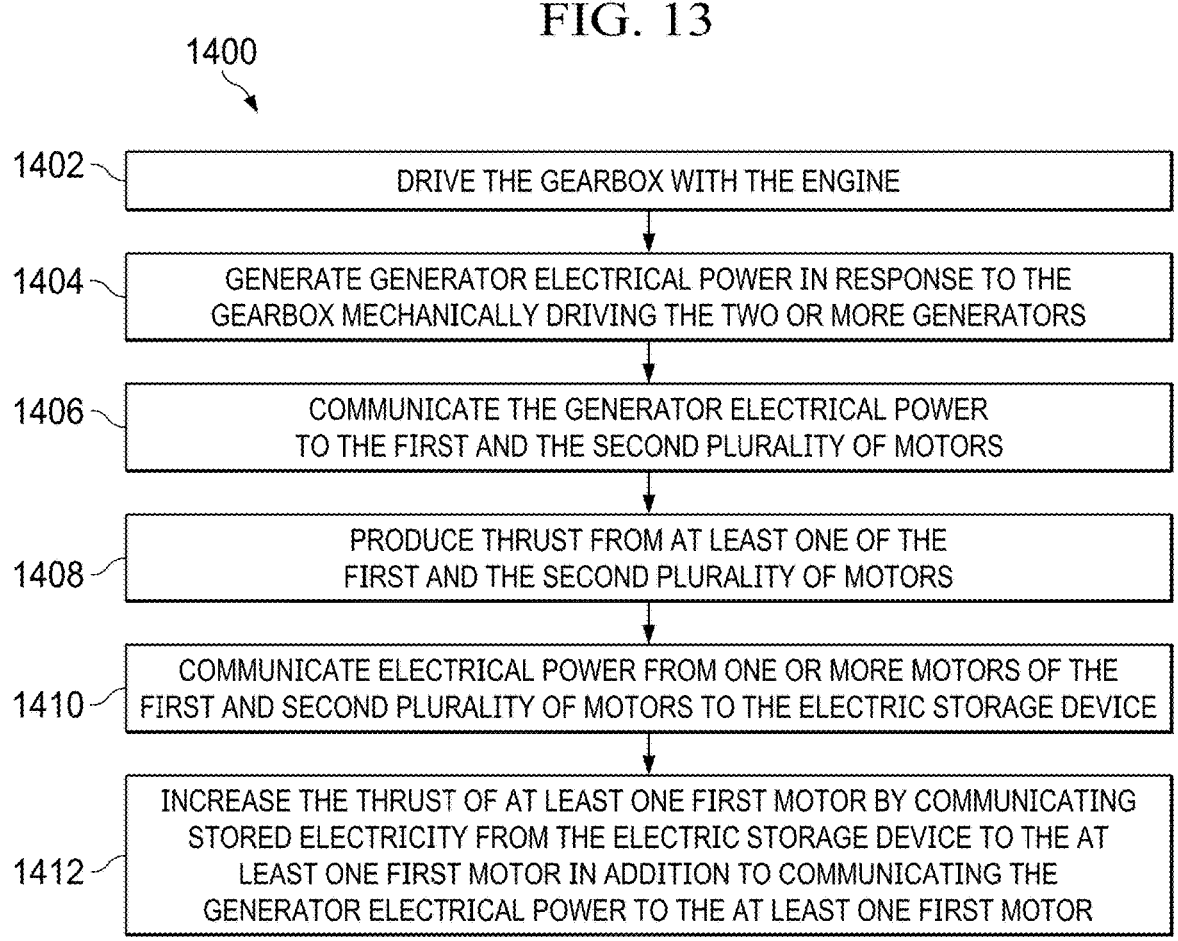
FIG. 14 illustrates another exemplary method of operating an aircraft with an electric distributed propulsion system.

FIG. 14 illustrates an exemplary method 1400 of operating an aircraft with an electric distributed propulsion system, described with reference to the other figures. At block 1402, a gearbox is driven by an engine. At block 1404, the gearbox mechanically drives a generator that generates generator electrical power. At block 1406, the generator electrical power is communicated to the plurality of fixed or variable pitch blade motors, which at block 1408 produce thrust. At block 1410, regenerative electric power from one or more of the fixed or variable pitch blade motors is communicated to an electric storage device. At block 1412, thrust from at least one first motor of the plurality of fixed or variable pitch blade motors is boosted by communicating stored electricity from the electric storage device to the first motor in addition to the generator electrical power supplied to the first motor. One or more of the generators may be a starter- or motor-generator and the electric storage device may power the starter- or motor-generator to start the engine or engines.

Figure 15:
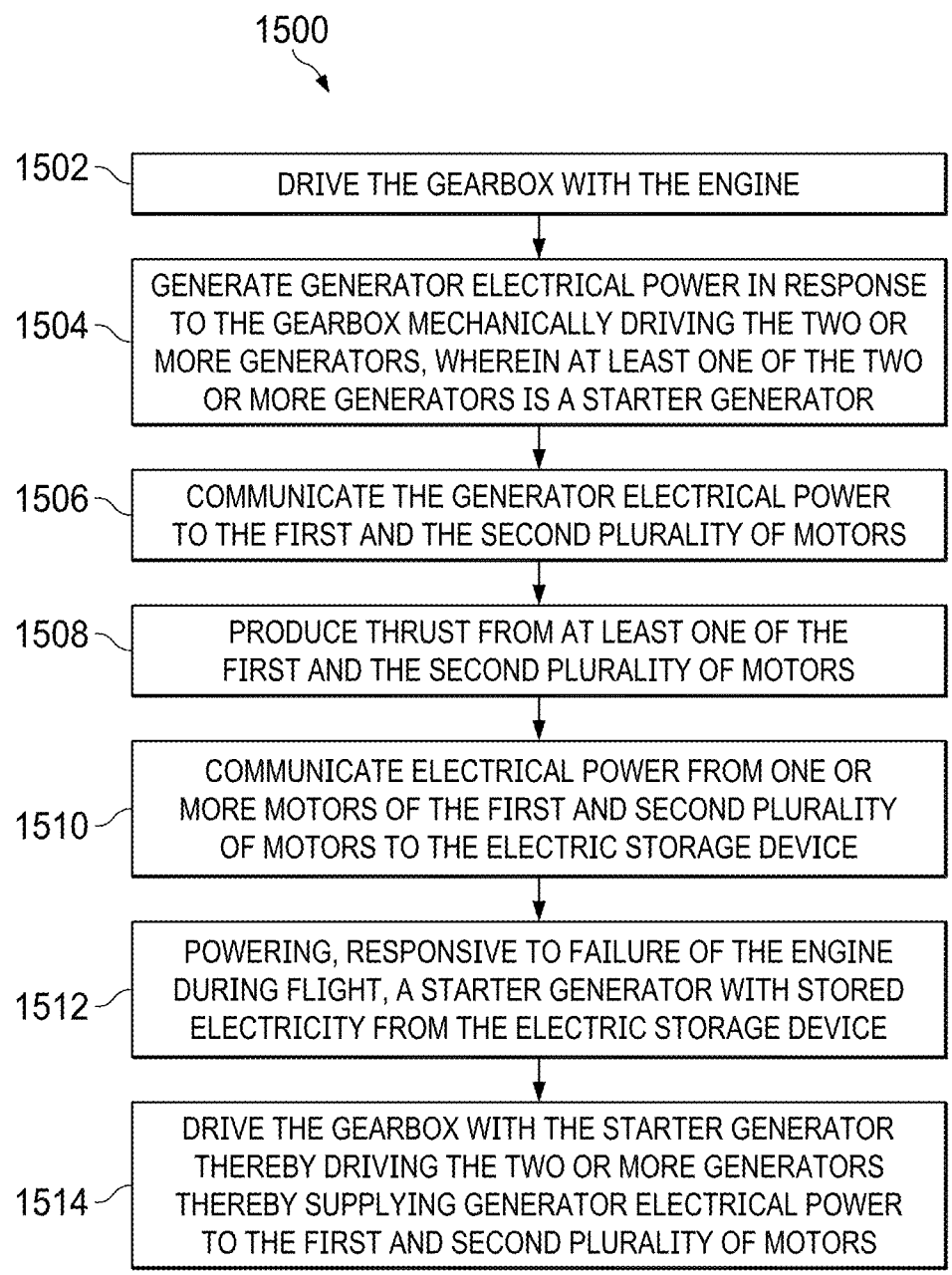
FIG. 15 illustrates another exemplary method of operating an aircraft with an electric distributed propulsion system.

FIG. 15 illustrates an exemplary method 1500 of operating an aircraft with an electric distributed propulsion system, described with reference to the other figures. At block 1502, a gearbox is driven by an engine. At block 1504, the gearbox mechanically drives a generator that generates generator electrical power. At least one of the generators is a starter- or motor-generator. At block 1506, the generator electrical power is communicated to the plurality of fixed or variable pitch blade motors, which at block 1508 produce thrust. At block 1510, regenerative electric power from one or more of the fixed or variable pitch blade motors is communicated to an electric storage device. At block 1512, the starter- or motor-generator is powered during flight with the stored electricity from the electric storage device, for example in response to engine failure. At block 1514, the starter or motor function of the starter- or motor-generator drives the gearbox and the gearbox drives the generator function of the one or more generators thereby supplying generator electricity to the plurality of fixed or variable pitch blade motors.

Figure 16:
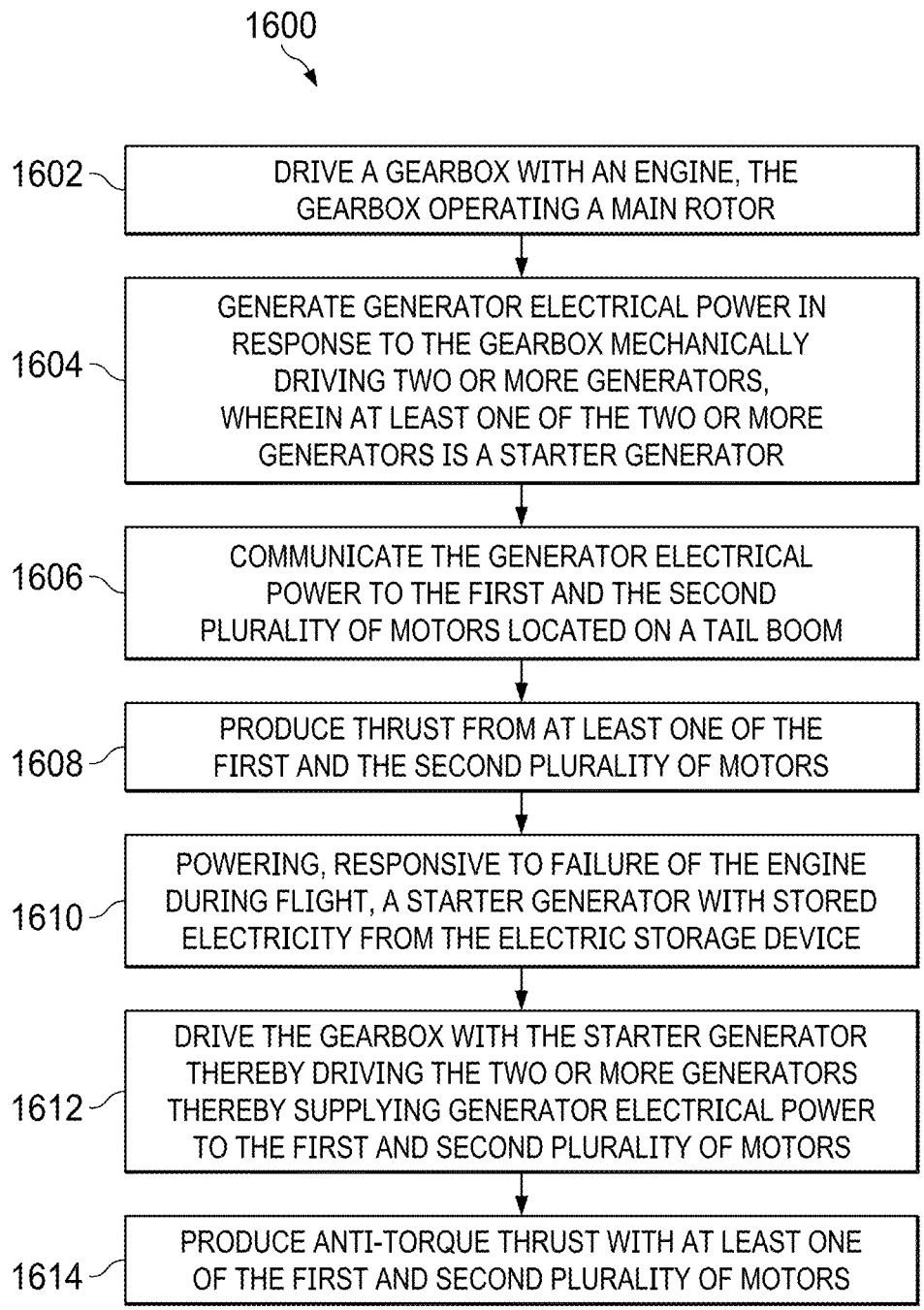
FIG. 16 illustrates an exemplary method of operating a helicopter with an electric distributed anti-torque system.

FIG. 16 illustrates an exemplary method 1600 of operating a helicopter with an electric distributed propulsion system, described with reference to the other figures. At block 1602, an engine drives a gearbox and the gearbox rotates a main rotor to provide lift. At block 1604, the gearbox mechanically drives one or more generators, which generate generator electrical power. At least one of the one or more generators is a starter- or motor-generator. At block 1606, the generator electrical power is communicated to a plurality of fixed or variable pitch blade motors that are located on a tail boom and at block 1608, one or more of the plurality of fixed or variable pitch blade motors produce thrust. The first and the second plurality of fixed or variable pitch blade motors may be oriented to produce thrust in opposite directions, thus the first plurality of fixed or variable pitch blade motors may produce thrust in an opposite direction from the second plurality of fixed or variable pitch blade motors. Regenerative electric power from one or more of the fixed or variable pitch blade motors may be communicated to an electric storage device. At block 1610, a starter- or motor-generator is powered, for example in response to engine failure, with the stored electricity from the electric storage device to drive the gearbox. At block 1612, the starter or motor function of the starter- or motor-generator drives the gearbox and the gearbox drives the generator function of the generators thereby supplying generator electricity to the plurality of fixed or variable pitch blade motors. At block 1614, anti-torque (or yaw) thrust is produced by the at least one of the first and the second plurality of fixed or variable pitch blade motors.

A number of implementations have been described. Nevertheless, it will be understood that various modifications may be made without departing from the spirit and scope of the disclosure. In some implementations, the fixed or variable blade pitch electric motor module can be controlled by pilot inputs in combination with the operating status of the air vehicle (e.g., hover, transition or forward flight). In implementations in which the rotorcraft is operated using some form of fly-by-wire or fly-by-light control systems, the fixed or variable blade pitch electric motor module operation can be controlled by the computer system, which, in turn, can get cues from the pilot's inputs, etc. Although various embodiments are described with reference to two or more generators, it is recognized that the architecture may utilize one or more generators. Gearbox is used herein to generally refer to gears and is not limited to the location of the gears. For example, and without limitation, the gearbox may be gears incorporated in the engine, stand-alone gearboxes, auxiliary gearboxes, and/or a main gearbox.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An electric distributed propulsion system, the system comprising:
   one or more generators connected to a gearbox;
   a first and a second plurality of motors connected to the one or more generators, wherein each motor of the first and second plurality of motors is connected to a blade to provide thrust;
   a first and a second power bus electrically connected between the one or more generators and the first and the second plurality of motors, wherein each power bus is independent of the other power bus;
   a first and a second controller independently connected to each of the first and second plurality of motors, wherein each of the first and second controllers serves as a primary and a backup controller to provide redundant control to both the first and the second plurality of motors; and
   dual channels in communication between pilot input sensors and the first and the second controllers, wherein:
      each channel of the dual channels is independent of the other channels and comprises a primary channel and a backup channel in communication with one of the first and second controllers;
      each channel of the dual channels comprises an additional channel to provide redundant communication to one of the first and second controllers; and
      the additional channel of each channel of the dual channels is coupled to a primary channel of a first one of the first and second controllers and enables communication between a pilot input sensor and a backup controller of a second one of the first controller and the second controller.

2. The system of claim 1, wherein the pilot input sensors comprise four sensors to provide triple redundancy for each of the first and the second controllers.

3. The system of claim 1, wherein the pilot input sensors comprise a triplex sensor.

4. The system of claim 1, wherein the pilot input sensors consists of a triplex sensor.

5. The system of claim 1, further comprising a first flight control computer comprising the first controller and first pilot input sensors; and
   a second flight control computer comprising the second controller and second pilot input sensors.

6. The system of claim 1, further comprising an electric storage device electrically connected to the one or more generators through first connections and the electric storage device electrically connected to the first and second plurality of motors through second connections.

7. The system of claim 6, wherein the pilot input sensors comprise four sensors to provide triple redundancy for each of the first and the second controllers.

8. The system of claim 6, wherein the pilot input sensors comprise a triplex sensor.

9. The system of claim 6, wherein the pilot input sensors consists of a triplex sensor.

10. The system of claim 6, further comprising a first flight control computer comprising the first controller and first pilot input sensors; and
    a second flight control computer comprising the second controller and second pilot input sensors.

* * * * *